(12) United States Patent
Ji et al.

(10) Patent No.: US 12,047,242 B2
(45) Date of Patent: Jul. 23, 2024

(54) INTENT-BASED NETWORK COMPUTING JOB ASSIGNMENT

(71) Applicant: NEC Laboratories America, Inc., Princeton, NJ (US)

(72) Inventors: Philip Ji, Cranbury, NJ (US); Ting Wang, West Windsor, NJ (US); Zilong Ye, La Verne, CA (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/481,988

(22) Filed: Oct. 5, 2023

(65) Prior Publication Data

US 2024/0129195 A1 Apr. 18, 2024

Related U.S. Application Data

(60) Provisional application No. 63/440,137, filed on Jan. 20, 2023, provisional application No. 63/413,663, filed on Oct. 6, 2022.

(51) Int. Cl.
*H04L 41/0896* (2022.01)
*H04L 41/122* (2022.01)

(52) U.S. Cl.
CPC ........ *H04L 41/0896* (2013.01); *H04L 41/122* (2022.05)

(58) Field of Classification Search
CPC ..................... H04L 41/0896; H04L 41/122
See application file for complete search history.

(56) References Cited

U.S. PATENT DOCUMENTS

| 6,778,531 | B1* | 8/2004 | Kodialam | ............... H04L 45/50 |
| | | | | 370/256 |
| 10,841,003 | B1* | 11/2020 | Ezra | ........................ H04L 45/02 |
| 11,595,294 | B1* | 2/2023 | Shem-Tov | .......... G06F 16/9024 |
| 11,743,169 | B2* | 8/2023 | Jain | ........................ H04L 45/44 |
| | | | | 709/238 |
| 2004/0174884 | A1* | 9/2004 | Wright | ............... H04L 12/4641 |
| | | | | 370/395.41 |

(Continued)

OTHER PUBLICATIONS

Dutta et al. "Embedding Paths into Trees: VM Placement to Minimize Congestion", ESA 2012, LNCS 7501, pp. 431-442, 2012. (Year: 2012).*

*Primary Examiner* — George C Neurauter, Jr.
(74) *Attorney, Agent, or Firm* — Joseph Kolodka

(57) ABSTRACT

Described is a novel framework, we call intent-based computing jobs assignment framework, for efficiently accommodating a clients' computing job requests in a mobile edge computing infrastructure. We define the intent-based computing job assignment problem, which jointly optimizes the virtual topology design and virtual topology mapping with the objective of minimizing the total bandwidth consumption. We use the Integer Linear Programming (ILP) technique to formulate this problem, and to facilitate the optimal solution. In addition, we employ a novel and efficient heuristic algorithm, called modified Steiner tree-based (MST-based) heuristic, which coordinately determines the virtual topology design and the virtual topology mapping. Comprehensive simulations to evaluate the performance of our solutions show that the MST-based heuristic can achieve an efficient performance that is close to the optimal performance obtained by the ILP solution.

4 Claims, 16 Drawing Sheets

(56) References Cited

U.S. PATENT DOCUMENTS

| | | | |
|---|---|---|---|
| 2005/0108071 A1* | 5/2005 | Jain | G06Q 10/04 709/218 |
| 2015/0248461 A1* | 9/2015 | Theeten | G06F 16/24524 707/718 |
| 2015/0248462 A1* | 9/2015 | Theeten | G06F 16/24524 707/688 |

* cited by examiner

Algorithm 1 Modified Steiner Tree-based Heuristic

1: enumerate all possible candidate virtual topology
2: for each candidate virtual topology do
3:    // sub-procedure of creating augmented graph
4:    initialize *augmented_graph*
5:    for each virtual node do
6:       establish an augmented link
7:       set the weight of augmented link to be 0
8:    // sub-procedure of modified Steiner tree
9:    initialize *steiner_tree* with *l_initial* that connects $s_0$ and $d_0$
10:   remove augmented links from $s_0$, except *l_initial*
11:   remove augmented links from $d_0$, except *l_initial*
12:   while not all virtual nodes are covered in steiner_tree do
13:      for each node *s* that not covered by *steiner_tree* do
14:         for each node *d* covered by *steiner_tree* do
15:            if there is a direct link *l* between *s* and *d* then
16:               add *l* to *link_set*
17:      select link *l_min* from *l_set*
18:      if node *s* on *l_min* is a virtual node then
19:         remove augmented links from *s*, except *l_min*
20:         remove augmented links from *d*, except *l_min*
21:   derive virtual node mapping using steiner_tree
22:   derive virtual link mapping using steiner_tree
23:   calculate TBC for the candidate virtual topology
24: select the best assignment with the minimum TBC
25: deploy the selected assignment, update the physical resource

*FIG. 4*

|  | The average number of virtual nodes used |
|---|---|
| First-fit | 2.972 |
| MST-based | 3.31 |
| ILP | 2.512 |

*FIG. 6(A)*

|  | The average communication hops of virtual links |
|---|---|
| First-fit | 3.559 |
| MST-based | 1.248 |
| ILP | 2.003 |

*FIG. 6(B)*

INTENT-BASED NETWORK COMPUTING JOB ASSIGNMENT

CROSS-REFERENCE TO RELATED APPLICATIONS

This application claims the benefit of U.S. Provisional Patent Application Ser. No. 63/413,663 filed Oct. 6, 2022, and Untied States Provisional Patent Application Ser. No. 63/440,137 filed Jan. 20, 2023, the entire contents of each of which are incorporated by reference herein as if set forth at length.

FIELD OF THE INVENTION

This application relates generally to network computing technologies. More particularly, it pertains to intent-based network computing job assignment and intent-based network computing job assignment reconfiguration.

BACKGROUND OF THE INVENTION

In recent years—due in part to the advancement of the Internet of Things (IoT), object detection, computing vision and related machine learning applications, there is an increasing demand of processing large scale data in the network edge. Mobile edge computing is a promising computing and networking set of technologies that can meet this demand, as it provides relatively rich computing resources (like a small cluster or cloud) near clients. However, the network bandwidth resource in the edge is very limited, so it is critically important to determine an optimal resource allocation strategy to optimize the network bandwidth consumption in the mobile edge computing infrastructure.

Hence, in this invention we propose a novel framework called intent-based computing jobs allocation. In this framework, the clients' computing job requests are expressed by an intent only (e.g., the size of the data to be processed, the computing model-either manager-worker model or pipeline model, etc.), rather than detailed virtual topology and corresponding computing and bandwidth demands. It is the job of the mobile edge computing infrastructure owner to determine the virtual topology and the corresponding computing demand at each virtual node (e.g., virtual machines) and bandwidth demand at each virtual links (e.g., the bandwidth connections between each virtual machines). Given that the mobile edge computing infrastructure owner has a global view of their physical computing and networking resource, it can make an optimal decision by jointly determine the virtual topology and the resource allocation for the clients' requests.

SUMMARY OF THE INVENTION

An advance in the art is made according to aspects of the present disclosure directed to a novel framework we call intent-based computing jobs allocation. In our framework, the clients' computing job requests are expressed by an intent only (e.g., the size of the data to be processed, the computing model—either manager-worker model or pipeline model, etc.), rather than detailed virtual topology and corresponding computing and bandwidth demands.

According to aspects of the present disclosure—and in sharp contrast to any prior art—a mobile edge, computing infrastructure owner determines virtual topology and corresponding computing demands at each virtual node (e.g., virtual machines) along with bandwidth demands at all virtual links (e.g., the bandwidth connections between each virtual machines). Given that the mobile edge computing infrastructure owner has a global view of the physical computing and networking resource, the owner can make an optimal decision by jointly determine the virtual topology and the resource allocation for the clients' requests.

Advantageously, our inventive framework helps an infrastructure owner to jointly optimize the assignment of virtual topology design and resource allocation for intent-based computing jobs.

Operationally, our novel inventive framework creates an augmented graph for each computing job request such that the assignment of virtual topology design and the resource allocation can be jointly considered. In addition, our inventive framework employs a novel method to modify a Steiner tree algorithm and uses the result of the modified algorithm to optimize the total bandwidth consumption while accommodating intent-based computing jobs in the mobile edge computing infrastructure.

BRIEF DESCRIPTION OF THE DRAWING

FIG. 3(A) and FIG. 3(B) are schematic diagrams showing illustrative graphs of: FIG. 3(A) the augmented graph and; FIG. 3(B) the Steiner tree according to aspects of the present disclosure;

FIG. 4 shows our illustrative Algorithm 1 of a modified Steiner Tree-based Heuristic according to aspects of the present disclosure;

FIG. 6(A) and FIG. 6(B) show: FIG. 6(A) average number of virtual nodes used; and FIG. 6(B) average communication hops of virtual links according to aspects of the present disclosure;

DETAILED DESCRIPTION OF THE INVENTION

Figure 1:
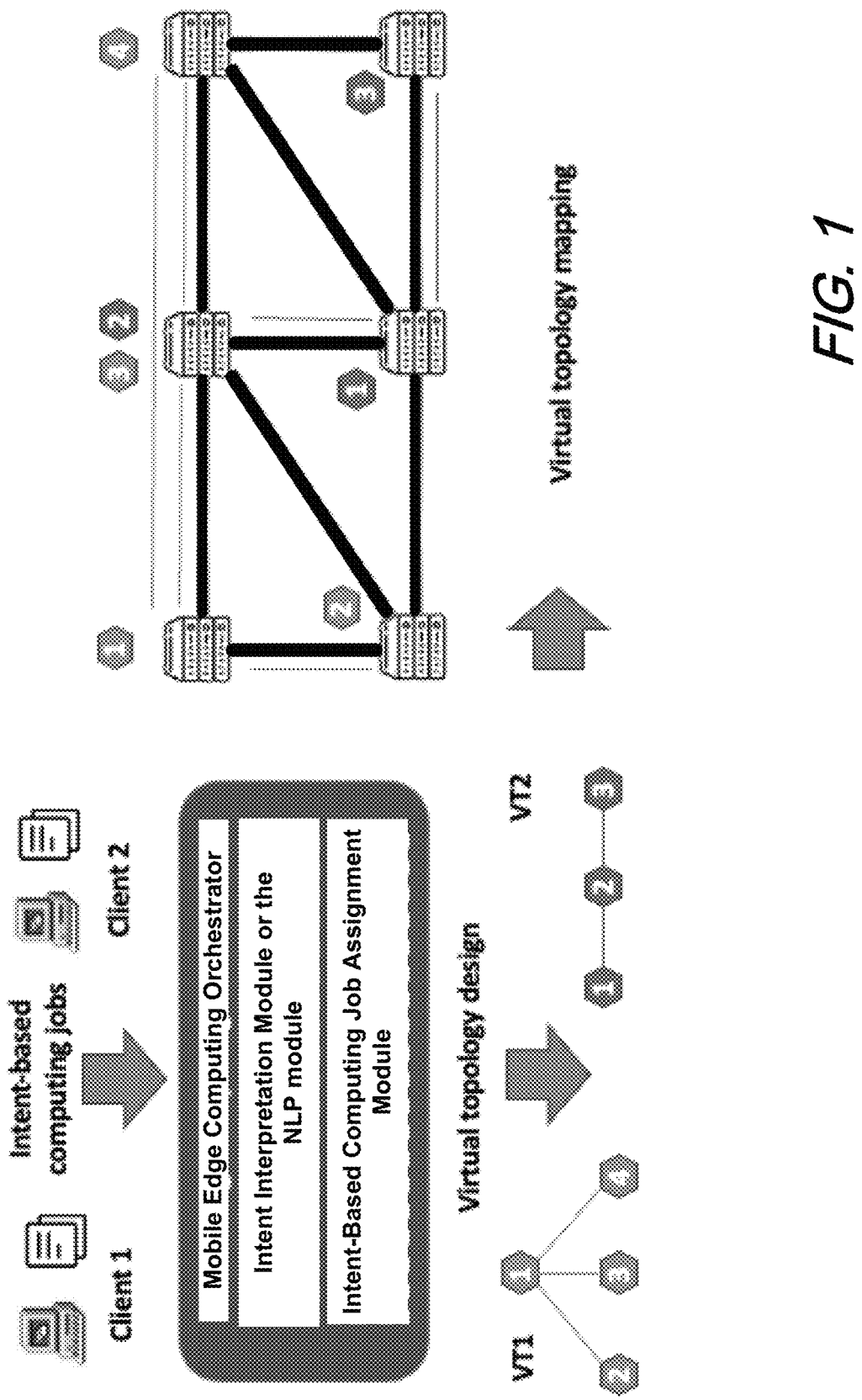
FIG. 1 is a schematic diagram showing an illustrative intent-based computing jobs assignment framework according to aspects of the present disclosure.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

In recent years, due to the advancement of the applications of Internet of Things (IoT), federated learning autonomous driving, computing vision, and related machine learning applications, there is an increasing demand of processing large scale data in the network edge. Mobile edge computing is a promising computing and networking ecosystem that can meet this demand, as it provides relatively rich computing resources (similar as a small cluster or cloud) near the clients. The edge servers that locate near the clients can provide sufficient computing resources for dealing with the computing job demands from the clients with a much faster response time, compared to that is offered by cloud computing. However, the network bandwidth resource in the edge is very limited, so it is critically important to develop an efficient resource allocation framework to optimize the network bandwidth consumption in the mobile edge computing infrastructure.

In this disclosure, we describe a novel framework called intent-based computing jobs allocation. In particular a client's computing job requests are expressed by an intent only (e.g., the size of the data to be processed, the computing model-either manager-worker model or pipeline model, etc.), rather than detailed virtual topology and corresponding computing and bandwidth demands. It is the job of the mobile edge computing infrastructure owner to determine the virtual topology and the corresponding computing demand at each virtual node (e.g., virtual machines) and bandwidth demand at each virtual links (e.g., the bandwidth connections between each virtual machines).

Given that the mobile edge computing infrastructure owner has a global view of their physical computing and networking resource, it can make an optimal decision by jointly determine the virtual topology and the resource allocation for the clients' requests. Our intent-based computing jobs assignment framework is flexible and easy-to-use for the clients, as they only need to specify their intent, rather than spending extra effort on designing the virtual topology and determine the computing and networking demand. In addition, the proposed intent-based computing jobs enables the mobile edge computing carrier to jointly consider the optimization of the virtual topology design and the virtual topology mapping based on a global point of view. In this way, the mobile edge computing carriers can try to avoid certain inappropriate virtual topologies that may lead to a costly virtual topology mapping, thus helping them to achieve an efficient utilization of their underlying physical resources.

We note that there have been some related research efforts on this topic in the past few years. For example, a geo-distributed data processing and aggregation system in the mobile edge computing empowered metro networks has been described. The resource allocation scheme disclosed therein attempted to minimize the average job completion time, by jointly optimizing the time consumed by computation and transmission. Another work proposed a just-in-time delivery scheme for computing jobs in mobile edge computing. This proposed solution applied deterministic dynamic networks to jointly optimize the network and computing resource allocation. In addition, there have been numerous other research works, which focused on addressing a virtual topology mapping problem. Proposed solutions for virtual topology mapping in optical networking infrastructures. In all these existing works, a client's computing job is represented by a specified virtual topology that consists of several virtual nodes and virtual links, with corresponding given computing demands and bandwidth demands, respectively. Such a specification may not be the best, as it requires the clients to provide detailed and private information (e.g., it requires the clients to spend extra effort to design the virtual topology for their computing jobs). In the meantime, it brings more restrictions to the fog computing carriers when they perform the optimization for the computing job assignment and the resource allocation.

In sharp contrast, the present disclosure discloses a novel fog computing framework, which only requires a client to provide an intent, such as the size of data to be processed, the computing model, etc. Detailed information, such as the virtual topology and the corresponding computing and bandwidth demands, is not required but optional. Our inventive intent-based framework provides a transparent, flexible, and easy-to-use service to clients, with a desirable level of privacy. More importantly, it provides fog computing carriers an opportunity to jointly optimize the virtual topology design, the resource assignment, and the job scheduling from a global point of view.

In this disclosure, we disclose and describe a novel intent-based computing jobs assignment framework, where the clients' requests are specified as an intent, such as the size of the data to be processed, the computing model to be used, etc. We formally define the intent-based computing jobs assignment problem, and we use an Integer Linear Programming (ILP) model to formulate this problem to facilitate the optimal solution. In addition, we propose a novel heuristic algorithm that can efficiently address this problem based on the modified Steiner tree (MST) algorithm. The proposed MST-based heuristic can coordinate the virtual topology design and virtual topology mapping and jointly optimize these assignments in one-shot. We conduct comprehensive simulations to evaluate the performance of the proposed solution. Simulation results show that the proposed MST-based heuristic can achieve a near-optimal performance, which is close to the optimal solution obtained by the ILP.

The organization of the disclosure is as follows. First, we will describe the proposed intent-based computing jobs assignment framework and formally define the intent-based computing jobs assignment problem. Next, we present the proposed ILP formulation for addressing this problem and describe our two heuristic algorithms that efficiently address this problem. Finally, we present the numerical results and insightful findings and conclude with a brief recap of our results.

Problem Description

A. Intent-Based Computing Jobs Assignment Framework

FIG. 1 is a schematic diagram showing an illustrative intent-based computing jobs assignment framework according to aspects of the present disclosure. In the mobile edge computing system, the clients generate computing job requests and send them to the mobile edge computing orchestrator for deployment. The clients' computing job requests are in the form of a specified intent, including basic information such as the size of the data volume to be processed, the computing model to be used (e.g., manager-worker or pipeline model). Other detailed information, such as the computing demand, the network bandwidth demands, and the virtual topology for the computing task, is optional.

In the illustration example in FIG. 1, we assume that client 1 specifies an intent to process an amount of data volume using the manager-worker model, and client 2 specifies an intent to process an amount of data volume using the pipeline model. The mobile edge computing orchestrator can then interpret the client's intent, by either abstracting the key information from the appropriate sector of the specified intent (e.g., similar as processing a network packet header based on the packet format) or abstracting the key information from the specified intent through a natural language processing (NLP) module. There is some on-going research using NLP to interpret human commands in terms of their network configuration requirements. The intent interpretation module (via NLP) is one of the components in our intent-based computing jobs assignment framework. However, in our framework, we apply a most advanced NLP algorithm for this purpose, and we only focus on how to optimize the deployment for the clients' computing job requests.

After the clients' intents are interpreted, the computing job requests will be processed by the intent-based computing jobs assignment framework for determining the optimal deployment strategy for the given request. More specifically, the intent-based computing jobs assignment framework will determine the virtual topology design and the virtual topology mapping for the given computing job request. For example, in the illustration example in FIG. 1, the computing job request from client 1 is determined to be conducted through a virtual topology of VT1 (a manager-worker model as specified in the intent by client 1), and the computing job request from client 2 is conducted through virtual topology of VT2 (a pipeline model as specified in the intent by client 2). The two virtual topologies are mapped to the underlying mobile edge computing infrastructure (e.g., several edge clusters connected by optical fiber links) as shown in the illustration example. Here, the edge clusters provide the computing resources to run the machine learning or data analysis applications for processing the data, and the optical fiber links are used for providing the network bandwidth for the data exchange between different virtual nodes. It is worth noting that the assignments of virtual topology design and the virtual topology mapping are jointly optimized by the intent-based computing jobs assignment module in the mobile edge computing orchestrator. The intent-based computing jobs assignment module can apply the ILP solution or the modified Steiner tree-based heuristic to make these assignments.

B. User Cases of Intent-Based Computing Jobs Assignment Framework

The proposed intent-based job assignment and scheduling framework can be used in a wide range of real-life applications. An example of the proposed intent-based job assignment and scheduling framework is its application in the connected autonomous driving system. In this system, there are a lot of computing job requests arriving constantly, such as reading the traffic signs, monitoring the road condition, computing the route, responding to sudden event, etc. All these requests require fast response for the vehicle to make the driving decision. So, rather than reaching out to the far away cloud computing infrastructure, fog computing infrastructure may be their first choice to perform these computing task.

Figure 2:
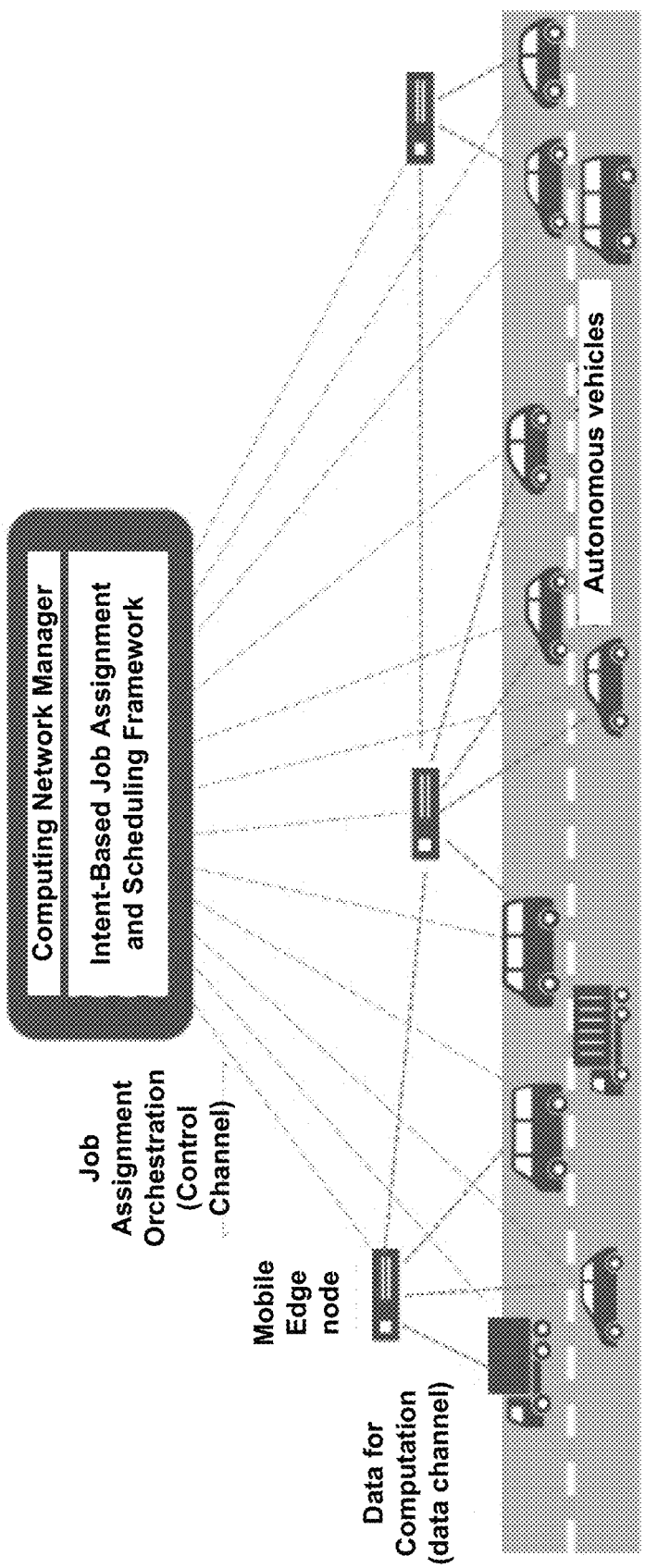
FIG. 2. Is a schematic diagram showing an illustrative connected autonomous driving system according to aspects of the present disclosure.

FIG. 2. Is a schematic diagram showing an illustrative connected autonomous driving system according to aspects of the present disclosure. As shown in FIG. 2, the system includes not only the individual autonomous vehicles (e.g., the client of the computing jobs), but also several fog computing nodes installed along the roadside. The fog computing carrier can deploy a computing network manager that connects to all vehicles and the fog nodes through wireless or wires connections. The computing network manager orchestrates the computation operations using the proposed intent-based job assignment and scheduling framework. In our architectural framework, the control message, and the actual computation data to be processed are transmitted over separate channels. The job requests and the control/orchestration decisions are transmitted through the control channels between the computing network manager and the individual client or fog node. The computation data to be processed and the computation results are transmitted through the data channels between the client and the fog node, and/or among the fog nodes. In this way, the computing network manager will not be involved in the actual data exchange process, thus achieving a relatively less workload.

During the autonomous driving operation, each vehicle has its on-board computer with sufficient computation power that can handle most of the computing jobs, such as analyzing the distance between vehicles, detecting pedestrians, interpreting road signs, lanes detection, etc. However, if there are special occasions, such as an exceptionally large crowd or an accident nearby involving unusual situation, the on-board computer in the autonomous vehicle may not be able to handle all the computation needs in time. In such a case, the autonomous vehicles (clients) can communicate with the computing network manager to direct some computing jobs to the fog nodes on the road side. These fog nodes have stronger computation power (e.g., faster processors, larger memory, and more storage), therefore the computing jobs from the autonomous vehicles (clients) can be processed in time.

The intent-based computing jobs assignment framework can be used in many related fields, not just limited to the autonomous driving example as described above. It can also be used in accommodating any type of computing jobs, such as machine learning or federated learning computing jobs.

Intent-Based Computing Jobs Assignment Problem

The intent-based computing jobs assignment problem is defined as follows. The mobile edge computing infrastructure includes several edge clusters that provide computing resources. The edge clusters are connected by optical fiber links that provide network bandwidth resource.

The mobile edge computing infrastructure is denoted by G(V, E), where V is the number of edge clusters and E is the number of optical fiber links. The mobile edge computing infrastructure can be used to serve several clients' computing job requests in the edge. The computing job requests are usually related to machine learning application or data analysis applications.

The clients' computing job requests are specified as an intent I, which includes some basic information about the computing jobs, such as the size of the data volume to be processed, the computing model to be used, etc. Given that the network bandwidth resource is limited in the mobile edge computing infrastructure, the objective of the intent-based computing jobs assignment problem is to serve all the clients' computing job requests with the minimum total bandwidth consumption. In order to achieve this goal, the intent-based computing jobs assignment problem need to address the following three assignments, including (1) the virtual topology that can be used to accommodate the clients' computing jobs requests, (2) the mapping assignment of virtual nodes over the physical nodes (e.g., the edge clusters), and (3) the virtual link mapping that connects the virtual nodes through physical routing paths over the underlying optical fiber communication networks. Note that, in this work, we only focus on two computing models, which are the manager-worker model and the pipeline model. For either of this model, as long as the number of virtual nodes is determined, the virtual topology can be determined accordingly.

For example, for client 1 in FIG. 1, if the number of virtual nodes to be used is determined to be 4, then the virtual topology will be as shown in FIG. 1, as the manager-worker model applies a star-like virtual topology. In the processing virtual topology design and virtual topology mapping, there are several constraints that need to be considered, including (1) the computing resource capacity at the edge clusters and (2) the physical optical communication network topology (or the network connectivity) of the mobile edge computing infrastructure.

The Integer Linear Programming Model

In this section, we formulate the intent-based computing jobs assignment problem using the Integer Linear Programming (ILP) technique in order to facilitate the optimal solution. In this section, we present the ILP model details, including the model parameters, the variables to be determined, the objective and the constraints.

In the ILP model, the following parameters are given:

G(V, E): the given mobile edge computing infrastructure, where V is the number of edge clusters and E is the number of optical fiber links that connects those edge clusters;

$C_i$: the capacity of the computing power at an edge cluster i, where $i \in V$;

R: the set of intent-based computing jobs, where each computing job request is denoted by r, where $r \in R$;

$D_r$: the data volume that needs to be processed by the given intent-based computing job request r, where $r \in R$;

$S_r$: the location of the ingress edge server that receives the given intent-based computing job request r, where $r \in R$;

MIN: the minimum number of virtual nodes used by each intent-based computing job request. This ensures that each computing job request is processed in a parallel model, rather than sequential on one single edge server, taking into consideration of the reliability concern.

There are two variables that need to be determined in this ILP model, which corresponds to (1) the number of virtual nodes used and the corresponding physical nodes that those virtual nodes are mapped to, and (2) the physical links along the routing path that the virtual links traverse over. They are denoted by the following variables:

$\theta_{r,i}$: the amount of the computing power used by request r, at edge cluster i, where $r \in R$ and $i \in V$. This is an integer variable, which determines the virtual node mapping assignment for the given request r;

$\delta_{r,i,j}$: the amount of network bandwidth consumed by request r over physical link between edge server i and edge server j; This is an integer variable, which determines the virtual link mapping assignment for the given request r;

Note that, for a given request r, the number of positive $\theta_{r,i}$ is the number of virtual nodes used by request r. Given the computing model specified in the intent of request r and the number of virtual nodes used, the virtual topology can be determined accordingly.

The objective of the intent-based computing jobs assignment problem is to minimize the total network bandwidth consumption in the underlying mobile edge computing infrastructure. Hence, the objective function can be defined as:

$$\min \sum_{r \in R, i \in V, j \in V} \delta_{r,i,j}$$

The following constraints need to be considered in the optimization process:

$$\sum_{i \in V} \theta_{r,i} = D_r, \forall r \in R \quad (1)$$

$$\sum_{r \in V} \theta_{r,i} \leq C_r, \forall i \in V \quad (2)$$

$$\theta_{r,i} \leq \frac{D_r}{\text{MIN}}, \forall r \in R \text{ and } \forall i \in V \quad (3)$$

$$\sum_{j \in V} \delta_{r,i,j} - \sum_{i \in V} \delta_{r,i,j} = \begin{cases} D_r & \text{if } i = S_r \\ -\theta_{r,i} & \text{otherwise} \end{cases} \quad (4)$$

Here, Eq. (1) ensures that the data volume that needs to be processed by a given request r is satisfied by a selected number of edge servers in the underlying mobile edge computing infrastructure. In Eq. (2), the total number of computing power that is consumed at each edge server is less than the computing power capacity at this edge server, which is the capacity constraint. Given that each intent-based computing job needs to be processed in a parallel version so that high reliability can be achieved, each request must be allocated to at least MIN number of edge servers in the mobile edge computing infrastructure. Eq. 3 ensures such a reliability constraint by limiting the maximum computing power allocated to a virtual node is:

$$\frac{D_r}{\text{MIN}}.$$

Finally, Eq. 4 is the network routing flow constraint. It will make sure that the physical routing path that a virtual link traverses over is in a linear format, and it provides sufficient bandwidth for supporting the data exchange between each virtual nodes.

Efficient Heuristic Approaches

The ILP solution that we present in the previous section is optimal; however, it may be resource consuming when the network size is large. In this section, we propose two heuristic algorithms that can efficiently address the intent-based computing jobs assignment problem, which are the first-fit algorithm and the modified Steiner tree-based (MST-based) algorithm. The details about these two heuristic algorithms are described in the following two subsections.

First-Fit Heuristic

A straightforward approach to address the intent-based computing jobs assignment problem is to use the first-fit strategy to determine the virtual topology design, the virtual node mapping assignment, and the virtual link mapping assignment in three steps. This approach is developed for the purpose as a baseline solution that outlines the upper bound of the performance for the intent-based computing jobs assignment solutions.

In terms of the virtual topology design, if the computing model is specified in the client's intent, the assignment can be simplified as choosing the number of virtual nodes to be used. In first-fit, the first step is to randomly select the number of virtual nodes to be used within the valid range of number of virtual nodes that are allowed to be used (e.g., usually it is between 3 and 16, as the acceleration of parallel computing reaches its extreme when the computing jobs are distributed among 16 nodes).

After the number of virtual nodes is determined, the virtual topology can be determined accordingly. The total size of the data volume that is requested by the client is evenly distributed among these virtual nodes, so the computing demands at each virtual node are decided and the network bandwidth demands at each virtual link are decided accordingly. Then, the second step of first-fit is to determine the virtual node mapping assignment. Here, first-fit will check each virtual node one by one. For a given virtual node, first-fit randomly selects an edge server to serve the virtual node by providing sufficient computing power as requested. After the virtual node mapping, the physical location of each virtual node is determined. Then, the third step of first-fit is to determine the virtual link mapping. For each virtual link, first-fit selects the shortest path between the two edge servers that accommodate the two end virtual nodes of a given virtual link. Accordingly, network bandwidth resources will be allocated (or consumed) to provide the demanded bandwidth resources to support the given virtual link.

Modified Steiner Tree-Based Heuristic.

As we can see, the first-fit heuristic addresses the virtual topology design, virtual node mapping and virtual link mapping assignments in decoupled three steps, so the solution may not be optimal. In this section, we propose a novel and efficient heuristic approach based on modified Steiner tree algorithm, which can address these assignments in one-shot in a global optimization manner.

In the MST-based heuristic, the algorithm enumerates each possible candidate virtual topology and selects the one with the minimum bandwidth consumption in terms of their optimal virtual node mapping and virtual link mapping assignments. As the virtual topology is determined by the number of virtual nodes used, the MST-based heuristic checks each candidate virtual topology by examine each possible candidate number of virtual nodes used. Then, for each candidate virtual topology, the MST-based heuristic conducts two sub-procedures, which are (1) constructing an auxiliary graph and (2) searching for the Steiner tree to connect all the virtual nodes on the auxiliary graph with the minimum cost.

Firstly, an auxiliary graph is created for each given candidate virtual topology, which can be used to jointly optimize the virtual node mapping and virtual link mapping assignments. More specifically, an augmented graph is initialized with the topology of the underlying mobile computing infrastructure, and several stand-alone virtual nodes (which are considered as the augmented nodes). After that, several augmented links are created by connecting each virtual node to each physical node (e.g., the edge clusters). The weight of each augmented link is set to be 0. The reason is because, if a virtual node is allocated to be run on a physical node, there is no bandwidth consumption for transfer data from the virtual node to the physical node, because the virtual node resides on the physical node.

Figure 3A:
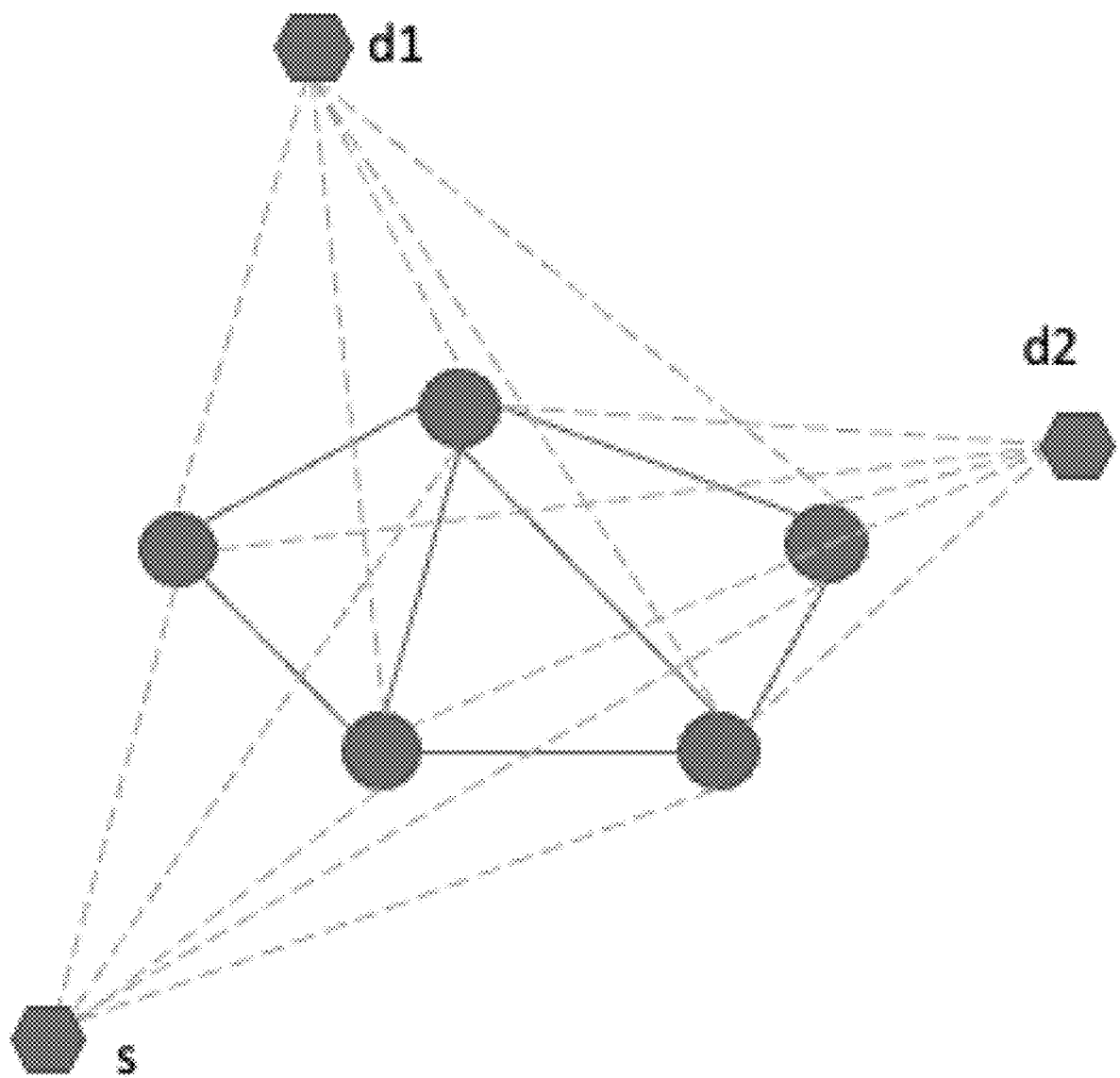
Figure 3B:
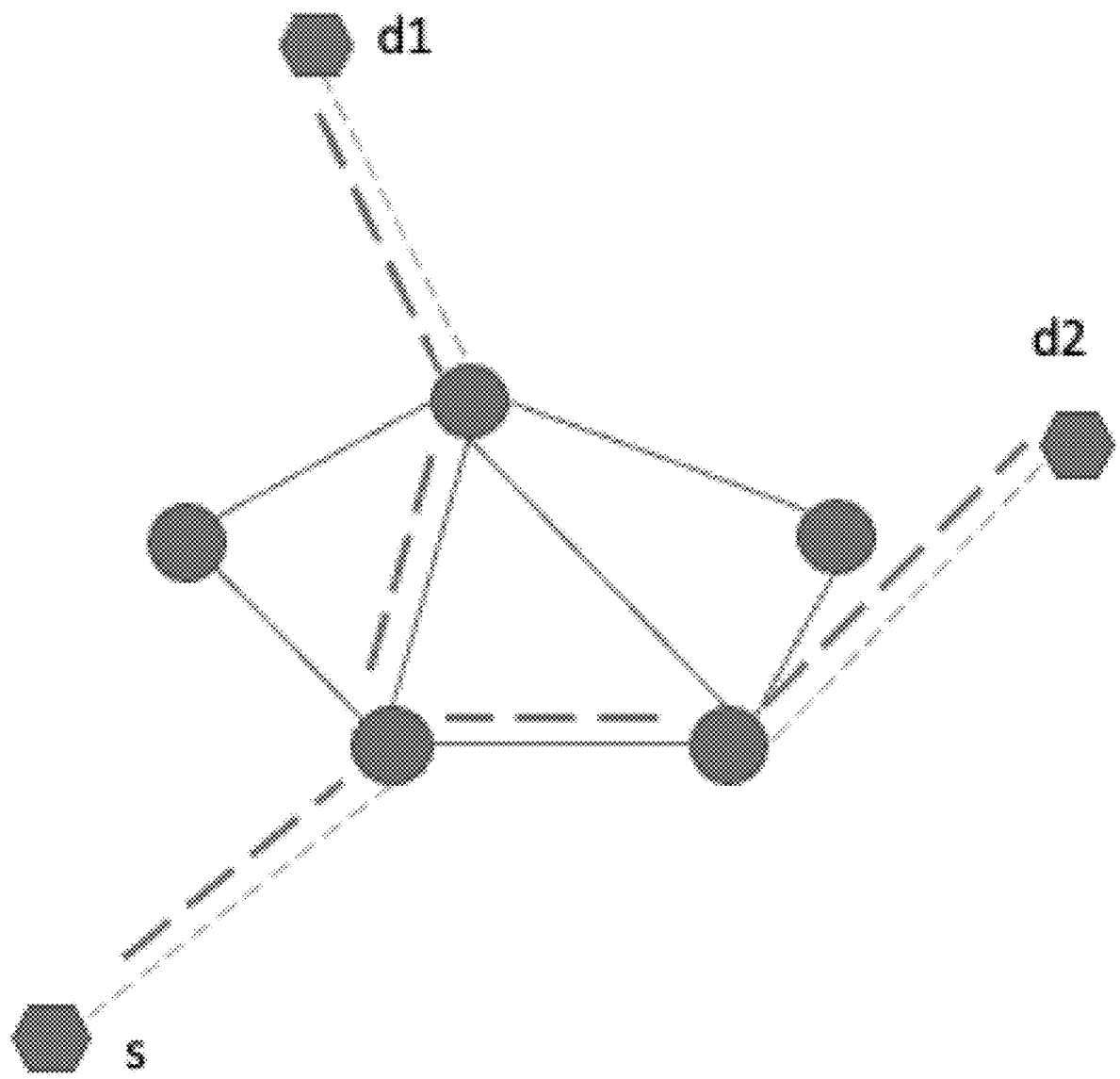

FIG. 3(A) and FIG. 3(B) are schematic diagrams showing illustrative graphs of: FIG. 3(A) the augmented graph and; FIG. 3(B) the Steiner tree according to aspects of the present disclosure. An example of the augmented graph for a candidate virtual topology with three virtual nodes is shown in FIG. 3(A).

Secondly, after an auxiliary graph is constructed for a given candidate virtual topology, the proposed MST-based heuristic applies a modified version of the Steiner tree algorithm to find a tree graph that connects all the virtual nodes with the minimum cost. Steiner tree can make sure to covers a given set of nodes on a graph with the minimum cost, so it can be applied here to search for the minimum cost tree that covers all the virtual nodes on the auxiliary graph (note that cover means connect the virtual nodes with a path).

The modifications of a traditional Steiner tree algorithm are in two places, which are in the step of initializing the Steiner tree and the step of adding new branches into the Steiner tree. First, in the initialization step, the Steiner tree it is initialized with a branch (denoted by l_initial) that is a randomly selected augmented link on the auxiliary graph. As we described in the augmented graph sub-procedure above, an augmented link connects a virtual node with a physical node, both of which are randomly selected. Since the MST-based heuristic checks each candidate virtual topology or each candidate number of virtual nodes used in the main procedure, it is not necessary to check splitting the virtual nodes in this sub-procedure.

Hence, in the step of initializing the Steiner tree, the algorithm removes all the augmented links from the selected virtual node (on the initial branch l_initial) to all the other physical nodes, except the selected augmented link l_initial. This step will ensure that a virtual node can only be allocated to be run on only one edge server. After that, the proposed MST-heuristic will remove all the augmented links from the selected physical node (on the initial branch l_initial) to all the other virtual nodes, except the selected augmented link l_initial. This will ensure that two virtual nodes are not mapped onto the same physical node, taking into consideration of the reliability concern.

Furthermore, in the step of adding new branches to the Steiner tree, the proposed MST-based algorithm checks if the newly added node s on the newly added branch l_min is a virtual node or not. If the newly added node s is a virtual node, then we need to perform the link removal process as discussed above for the given virtual node s and its connected physical node d, so that we can ensure a virtual node is only mapped to one physical node and two virtual nodes from the same computing job request are not mapped to the same physical node. These steps are performed iteratively to add branches to the Steiner tree until the Steiner tree covers all the virtual nodes.

After the Steiner tree is found for a given candidate virtual topology (or the corresponding candidate number of virtual nodes used), the virtual node mapping and virtual link mapping assignments can be obtained immediately. This is because there exists exactly one path between every two nodes on the Steiner tree. Hence, each virtual node is connected to exactly one physical node for the virtual node mapping assignment. Between each virtual node, there exists a unique physical routing paths that connects these two virtual nodes, which can be provisioned to support the corresponding virtual link between these two virtual nodes.

After that, the bandwidth consumption for the candidate virtual topology and the corresponding virtual node mapping and virtual link mapping can be calculated. The MST-based heuristic then selects the virtual topology design and the corresponding virtual node mapping and virtual link mapping assignments that yields the minimum bandwidth consumption, and then deploy it on the underlying mobile edge computing infrastructure and update its resource utilization status.

FIG. 4 shows our illustrative Algorithm 1 of a modified Steiner Tree-based Heuristic according to aspects of the present disclosure. The pseudocode of the proposed MST-based heuristic is shown in Algorithm 1 as below.

Complexity Analysis

The first-fit heuristic addresses the virtual topology design, virtual node mapping and virtual link mapping assignments in three decoupled steps. Each of this step simply selects an option from an enumeration of all the candidates that is in the magnitude of $O(N)$, where N is the maximum number of virtual nodes that are allowed to be used for each virtual topology (note the number of virtual nodes determines the virtual topology, so N is also the number of candidate virtual topologies). So, the time complexity of the first-fit algorithm is $O(N)$.

The MST-based heuristic jointly optimizes the virtual topology design, the virtual node mapping and the virtual link mapping in one-shot, through the use of an augmented graph and the modified Steiner tree. As shown in the pseudocode in Algorithm 1, there is an outer loop iteration that checks each candidate virtual topology, so the time complexity is $O(N)$. Inside each iteration, the MST-based heuristic needs to create the Steiner tree through a major iteration from lines 12 to 20. This major iteration has a time complexity of $OO(MM^3)$. Considering the above outer and inner iterations, we can see that the time complexity of the MST-based heuristic is $OO(MM^4)$ Efficient Heuristic Approaches We conduct comprehensive simulations to evaluate the performance of the proposed ILP solution and the two heuristic algorithms. The simulations are performed based on a real-world mobile edge computing infrastructure. Due to the limited computational resource, we only use a subset of the edge clusters nodes from this infrastructure, which includes 30 edge clusters and 61 optical fiber links. In the simulation, each edge cluster is associated with a computing power that can process 10 Gb data per second, and each network link is supposed to provide sufficient network bandwidth resources (our objective is to minimize the total bandwidth consumption, so there is no limit here). All the clients' intent-based computing job requests are randomly generated.

With regarding to their intent, each of the computing job request needs to process a data size randomly distributed within the range between 50 Mb and 2 Gb, and the computing model for computing given computing job request is randomly chosen between the manager/worker model and the pipeline model.

Figure 5:
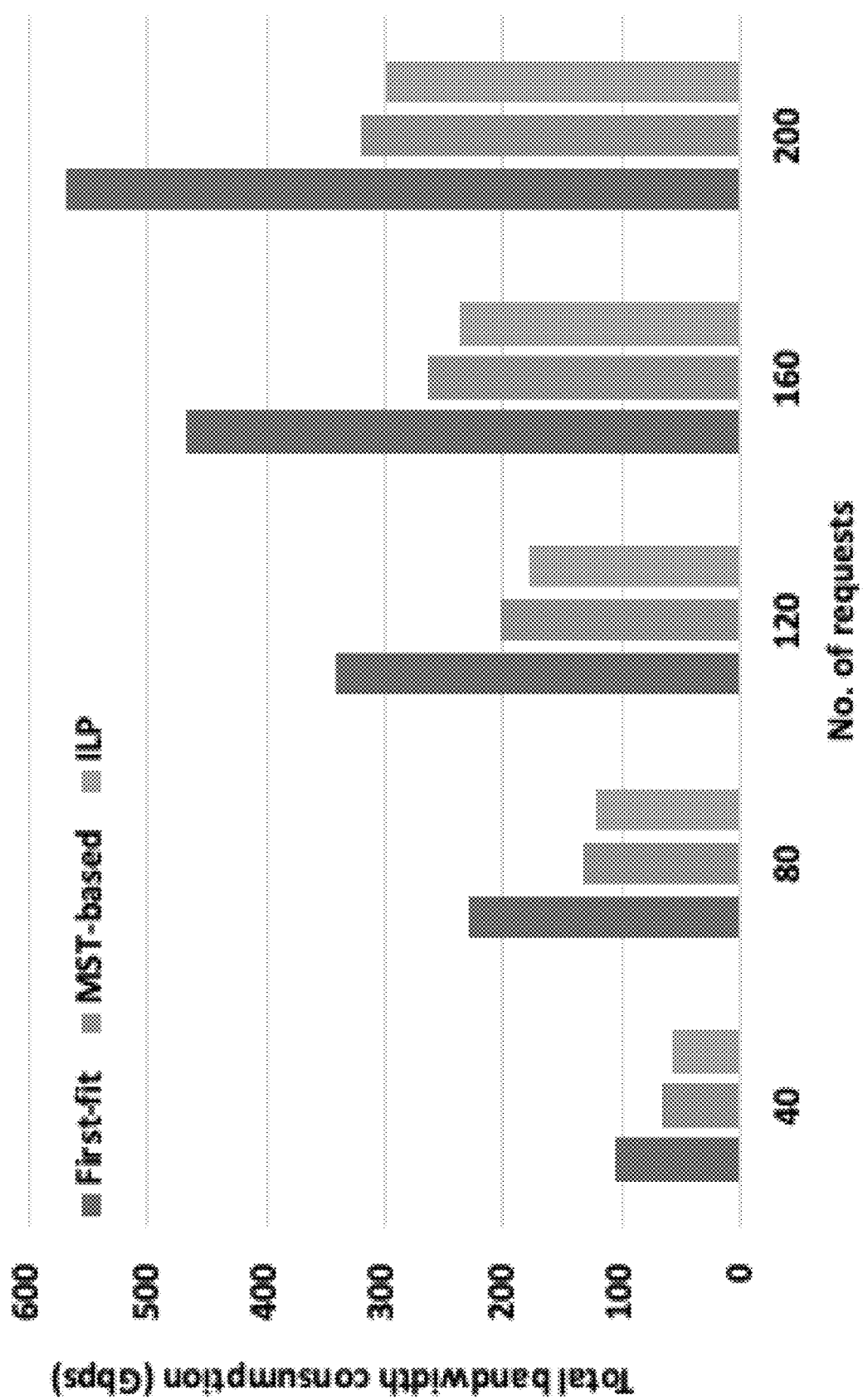
FIG. 5 shows an illustrative bar graph of simulation results of total bandwidth consumption according to aspects of the present disclosure.

FIG. 5 shows an illustrative bar graph of simulation results of total bandwidth consumption according to aspects of the present disclosure. FIG. 5 compares the first-fit heuristic, MST-based heuristic and the ILP solution in terms of the total bandwidth consumption, as the number of computing job requests increases. We can see that, as the number of requests increases, the total bandwidth consumption for all the approaches increases. Among these three approaches, the first-fit heuristic achieves the worst performance and the ILP achieves the best performance. Compared to the first-fit heuristic, the MST-based heuristic and the ILP solution can achieve a performance improvement by 42% and 47%, respectively.

It is worth noting that the total bandwidth consumption by the MST-based heuristic is very close to the optimal performance obtained by the ILP. Considering the polynomial time complexity of MST-based heuristic, it is an efficient approach in terms of both the cost of bandwidth consumption and the time complexity. Such an efficient performance is due to that the MST-based heuristic adopts the augmented graph and the modified Steiner tree that can jointly optimize the virtual topology mapping, the virtual node mapping and the virtual link mapping assignments in one-shot. In particular, the modified Steiner tree sub-procedure helps the MST-based heuristic to connect all the virtual nodes with a virtual topology that has the minimum cost.

Furthermore, we observe an interesting finding, when comparing the MST-based heuristic and the ILP solution. More specifically, we evaluate the performance of the number of virtual nodes used and the average communication hops of virtual links, in order to perform a deeper exploration about why the MST-based heuristic and the ILP solution can achieve an efficient performance in terms of the total bandwidth consumption. The performances of the number of virtual nodes used and the average communication hops of virtual links are stable, regardless of the number of requests increases.

FIG. 6(A) and FIG. 6(B) show: FIG. 6(A) average number of virtual nodes used; and FIG. 6(B) average communication hops of virtual links according to aspects of the present disclosure Their average performances are shown in FIG. 6(A) and FIG. 6(B). Interestingly, we observe that the ILP solution uses the minimum number of virtual nodes and an intermediate level number of average communication hops of virtual links, while the MST-heuristic uses the maximum number of virtual nodes and the smallest average communication hops of virtual links.

From these results, we can see that, even the MST-based heuristic and the ILP solution achieves similar performance in terms of the total bandwidth consumption, their virtual topology design and virtual topology mapping strategies are quite different. Here, the MST-heuristic leans towards distributing the workload to more edge clusters, while the average communication hops between those edge clusters are relatively small (e.g., 1.249 hops in average). We call this as using the spread strategy, as it spreads out the workload to the edge clusters that is close to or next to each other.

As a comparison, the ILP solution is more likely to distribute the workload to around two to three edge clusters, and the average communication hops between each pair of edge clusters is around two hops (e.g., 2.003) in average. We call this as using the cross strategy, as the workload is not next to each other, but exhibits a two-hop (in average)

interval across each other. Both the spread strategy and the cross strategy performs well for allocating the intent-based computing job requests in the mobile edge computing infrastructure, in terms of the total bandwidth consumption.

At this point, we have described a novel framework, called intent-based computing jobs assignment framework, for efficiently accommodating the clients' computing job requests in the mobile edge computing infrastructure. For the first time, we define the intent-based computing job assignment problem, which jointly optimizes the virtual topology design and virtual topology mapping with the objective of minimizing the total bandwidth consumption. We use the Integer Linear Programming (ILP) technique to formulate this problem, to facilitate the optimal solution. In addition, we employ a novel and efficient heuristic algorithm, called modified Steiner tree-based (MST-based) heuristic, which coordinately determines the virtual topology design and the virtual topology mapping in one-shot. We conducted comprehensive simulations to evaluate the performance of our solutions. Simulation results show that the MST-based heuristic can achieve an efficient performance that is close to the optimal performance obtained by the ILP solution. Furthermore, we analyzed the strategies used by the MST-based heuristic and the ILP solution. We observed insightful findings that the MST-based heuristic uses a spread strategy and the ILP solution applies the cross strategy. Our solutions and the analysis results can be helpful for the mobile edge computing carriers to develop their resource allocation orchestrator.

We now describe further our novel framework that provisions the computing job requests based on their intent only. As noted previously, we described a novel procedure to jointly determine the virtual topology design and resource allocation for intent-based computing jobs in the mobile edge computing infrastructure. Our inventive procedure first creates an augmented graph, and then applies a modified Steiner tree algorithm and achieves an efficient virtual topology design and resource allocation assignment that minimizes the total bandwidth consumption in the mobile edge computing infrastructure.

Some notable features of our inventive procedure include the following.

The procedure addresses the computing job allocation and scheduling in the fog computing infrastructure, based on the client's intent only.

The procedure jointly solves the assignment of virtual topology design and resource allocation for intent-based computing jobs in the mobile edge computing infrastructure.

The procedure applies a novel way to create an augmented graph for each computing job request to jointly consider the assignment of virtual topology design and resource allocation.

The procedures apply a modified Steiner tree algorithm on the augmented graph to optimize the resource allocation in the mobile edge computing infrastructure.

The procedure provides a guideline about what virtual topology to use to efficiently accommodate the client's computing job request.

The procedure provides a guideline about how to allocate the computing resource and the bandwidth resource to efficiently accommodate the client's computing job request.

The proposed invention jointly addresses the problem of virtual topology design and virtual topology assignment for intent-based computing jobs in the mobile edge computing infrastructure.

As presently structured, our inventive procedure has been implemented as one main procedure and two sub-procedures. The main procedure performs the intent-based computing job assignments, and the two sub-procedures create augmented graph and construct Steiner tree, respectively. The detailed description of these techniques is as follows.

Figure 7:
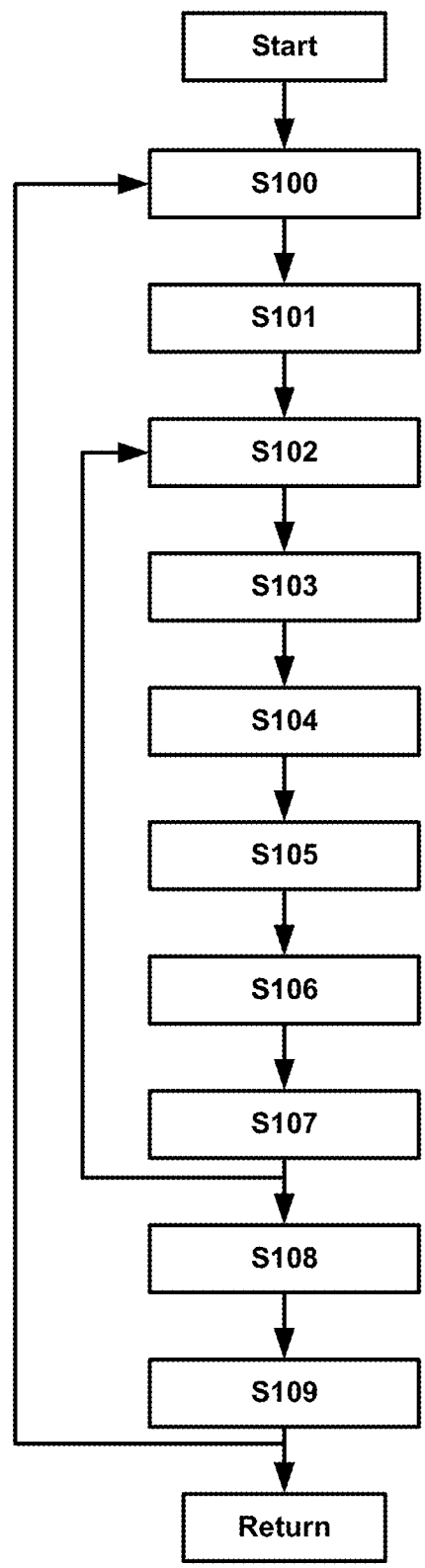
FIG. 7 is a schematic flow diagram showing an illustrative intent-based computing job assignment procedure according to aspects of the present disclosure.

FIG. 7 is a schematic flow diagram showing an illustrative intent-based computing job assignment procedure according to aspects of the present disclosure.

Step 100: This step is the entering point of a loop that repeat steps from 100 to 109. The proposed procedure processes each request one by one. The current request that is being processed is denoted by r.

Step 101: In this step, the proposed procedure enumerates all the possible number of virtual nodes to be used for the given request r. The number of virtual nodes to be used is the key factor that forms the virtual topology for the client's request. Given the number of virtual nodes to be used and the user specified computing model (e.g., either manager-worker model, pipeline model or other parallel computing model), the virtual topology can be determined.

Step 102: This step is the entering point of an inner loop that repeats steps 102 to 107. It will examine each candidate number of virtual nodes to be used. Correspondingly, it will examine each virtual topology one by one.

Figure 8:
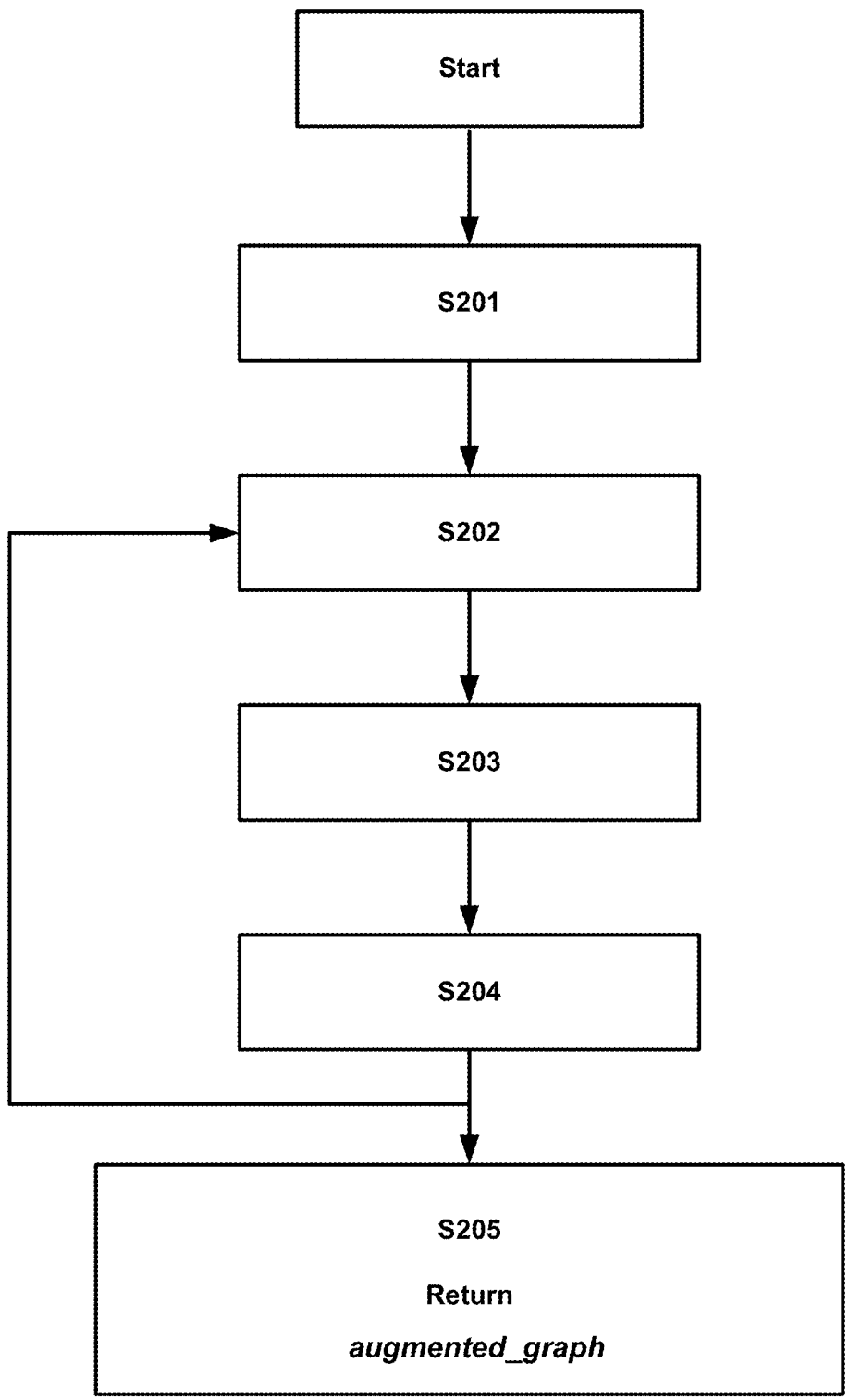
FIG. 8 is a schematic flow diagram showing an illustrative sub-procedure for creating an augmented graph according to aspects of the present disclosure.

Step 103: This step calls the augmented graph sub-procedure to create an augmented graph for the given number of virtual nodes to be used. The generated augmented graph can be used to address the virtual node mapping assignment and virtual link mapping assignment (which are the two assignments in the virtual topology mapping) in one-step. The steps outlining creating of an augmented graph are illustrated in FIG. 8 and will be described with reference to the augmented graph sub-procedure.

Step 104: This step calls the Steiner tree sub-procedure to obtain the Steiner tree that connects all the virtual nodes with the minimum cost. Once the Steiner tree is obtained, the virtual node mapping and virtual link mapping can be assigned accordingly. This is the key step to achieve the optimal intent-based computing job assignments that minimize the total bandwidth consumption in the underlying mobile edge computing infrastructure. The detailed steps of how to obtain the Steiner tree are illustrated in FIG. 3, and will be described in the Steiner tree sub-procedure in the following section.

Step 105: This step determines the virtual node mapping assignment, based on the obtained Steiner tree. The Steiner tree connects all the virtual nodes in a tree structure. As it is a tree structure, there exists one and only one link between each node. Hence, for each virtual node, it is only connected with one physical node on the Steiner tree. Thus, a virtual node can be mapped (or assigned) to the corresponding connected physical node for running.

Step 106: This step determines the virtual link mapping assignment, based on the obtained Steiner tree. Given the client specified computing model (either manager-worker model or pipeline model or other parallel computing model), the demanded connectivity between each virtual node (the so-called virtual link) can be determined. As the Steiner tree connects all the virtual nodes in a tree structure, there exists exactly one path between any two nodes. The unique physical routing path between each virtual link can be easily obtained by running any routing algorithm (e.g., shortest path algorithm). Thus, a virtual link can be mapped (or provisioned) to the corresponding physical routing path as found.

Step 107: This step evaluates the cost of the virtual topology mapping for a candidate virtual topology in terms of the bandwidth consumption. In the client's intent, the size of the data to be processed is specified. The data will be evenly distributed among the allocated virtual nodes for processing. After the processing, the data will be exchanged between virtual nodes via the virtual link, and thus consumes the bandwidth along the physical routing path that supports the virtual link. As the virtual node mapping and virtual link mapping are assigned in step 105 and 106, the bandwidth consumption can be calculated accordingly in this current step.

Step 108: This step selects the optimal virtual topology and virtual topology mapping assignment for a given request r. After evaluating the bandwidth consumption for each candidate virtual topology and its corresponding virtual topology mapping in the loop from steps 102 to 107, the procedure sorts them, and selects the one that introduces the minimum bandwidth consumption as the virtual topology design (in terms of the number of virtual nodes used) and the virtual node mapping for the given request r.

Step 109: This step deploys the selected virtual topology and its corresponding virtual topology mapping onto the underlying mobile edge computing infrastructure. Each virtual node will consume the computing resources on the allocated physical nodes. Each virtual link will consume bandwidth resources on physical links over the provisioned physical routing paths. After these resources are consumed, the procedure updates the resource utilization on the mobile edge computing infrastructure, and then continues to process the next request.

FIG. 8 is a schematic flow diagram showing an illustrative sub-procedure for creating an augmented graph according to aspects of the present disclosure.

Step 201: This is the initialization step for the sub-procedure that creates the augmented graph for the given number of virtual nodes to be used in step 103. The augmented graph is initialized with the topology of the underlying mobile computing infrastructure. In addition, the augmented graph consists of a few stand-alone nodes that are the virtual nodes.

Step 202: This is the entering point of a loop that repeats steps 202 to 204. It checks each virtual node on the augmented graph.

Step 203: This step is used for establishing augmented links. More specifically, this step establishes augmented links from the given virtual node to all the physical nodes.

Step 204: This step set the weight of each augmented link to be 0. The reason is because, if a virtual node is allocated to be run on a physical node, there is no bandwidth consumption for transfer data from the virtual node to the physical node, because the virtual node resides on the physical node.

Step 205: After repeating steps 202 to 204 for each virtual node, the augmented graph can be constructed and returned to where it is called in step 103 for further processing.

Figure 9:
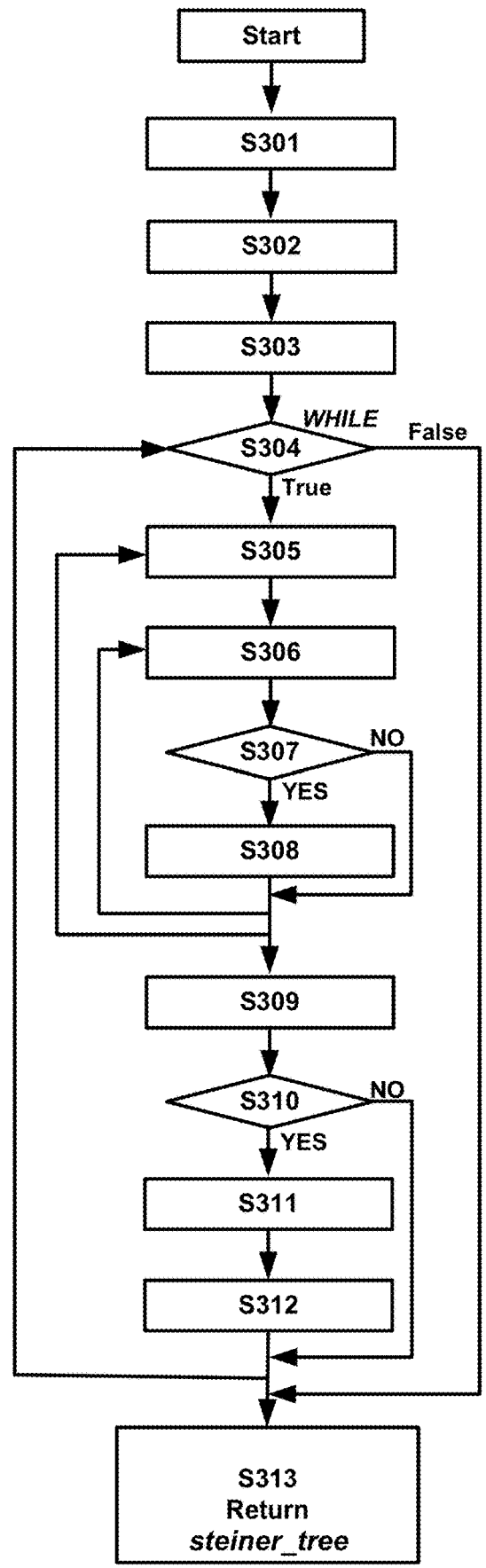
FIG. 9 is a schematic flow diagram showing an illustrative sub-procedure of a modified Steiner tree algorithm according to aspects of the present disclosure.

FIG. 9 is a schematic flow diagram showing an illustrative sub-procedure of a modified Steiner tree algorithm according to aspects of the present disclosure.

Step 301: This is the initialization step for obtaining the Steiner tree on the augmented graph that is used in step 104. The Steiner tree is stored in a list called steiner_tree, and it is initialized with a branch (or link) that is a randomly selected augmented link on the augmented graph. As we described in the augmented graph sub-procedure in the above, an augmented link connects a virtual node with a physical node. In this initialization step, the randomly selected augmented link's two ends are a randomly selected virtual node and a randomly selected physical node.

Step 302: This step ensures that a virtual node can only be allocated to be run on one physical node, e.g., no splitting is allowed. The reason is because the proposed invention will examine each possible number of virtual nodes to be used from step 102 to 107. The consequence of splitting a virtual node will introduce a larger number of virtual nodes to be used, which will be checked from step 102 to 107, so it is not necessary to check it again here. To achieve this goal, this step will remove all the augmented links from the selected virtual node (i.e., the virtual node on the randomly selected augmented link in step 301) to the other physical nodes, except the selected augmented link in step 301.

Step 303: This step ensures that two virtual nodes are not allowed to be allocated to be run on the same physical node. The reason is due to the concern of reliability, that a single failure of the physical node cannot bring down two virtual nodes at the same time. To achieve this goal, this step will remove all the augmented links from the selected physical node (i.e., the physical node on the randomly selected augmented link in step 301) to the other virtual nodes, except the selected augmented link in step 301.

Step 304: This is the entering point of a loop that repeats step 304 to 312. These steps will repeat when not all the virtual nodes are covered by the branches on the Steiner tree.

Step 305: This is the entering point of an inner loop that repeats step 305 to 308. Among all the nodes on the augmented graph, this step will check each node s that has not been covered by any branch on the Steiner tree.

Step 306: This is the entering point of a further inner loop that repeats step 306 to 308. Among all the nodes on the augmented graph, this step will check each node d that has already been covered by branches on the Steiner tree.

Step 307: This step checks if there is a direct link l on the augmented graph that connects node s (examined since step 305) and node d (examined since step 306). If it is true, link l can be considered as a candidate to be a new branch that will be added to the Steiner tree, so it will proceed to step 308. If there is not a direct link between s and d, then the proposed sub-procedure continues to check the next node that has been covered by branches on the Steiner tree, so it will go back to step 306.

Step 308: This step will add the direct link l found in step 307 to a set called l_set. Here, l_set consists of several candidate links that can be added as a new branch to the Steiner tree.

Step 309: This step adds a new branch to the Steiner tree. After the loop from step 306 to 308, several candidate links are added to the set of l_set. Among all the candidate links, the one with the minimum cost l_min will be selected as a new branch that will be added to the Steiner tree. This step ensures that the found Steiner tree connects all the virtual nodes with minimum cost.

Step 310: This step checks whether the newly added node s on the newly added branch l_min is a virtual node. If it is a virtual node, then proceed to step 311 and 312 for further processing; otherwise, skip the next two steps and go back to the loop in step 304. The reason behind this is because, if a newly added node is a virtual node, then the newly added link connects a virtual node and a physical node, thus it is corresponding to a virtual node mapping. When it is a virtual node mapping, we need to make sure that (a) a virtual node is not allowed for further splitting (to be ensured in step 311) and (b) two virtual nodes are not allowed to be allocated to run on the same physical node (to be ensured in step 312). If a newly added node is a physical node, then it is not corresponding to a virtual node mapping. Hence, it is not necessary to consider these actions, but just continues to explore adding other branches to the Steiner tree.

Step 311: This step is similar as step 302. The purpose is to ensures that a virtual node can only be allocated to be run on one physical node, e.g., no splitting is allowed. To achieve this goal, this step will remove all the augmented links from the newly added virtual node s (examined since step 305) to the other physical nodes, except the newly added link l_min.

Step 312: This step is similar as step 303. The purpose is to ensures that two virtual nodes are not allowed to be allocated to be run on the same physical node. To achieve this goal, this step will remove all the augmented links from the already covered node d (examined since step 306) to the other virtual nodes, except the newly added link l_min.

Step 313: After steps 301 to 312, the Steiner tree that connects all the virtual nodes with the minimum cost can be found. It will be returned to where it is called in step 104 and proceed.

Figure 10:
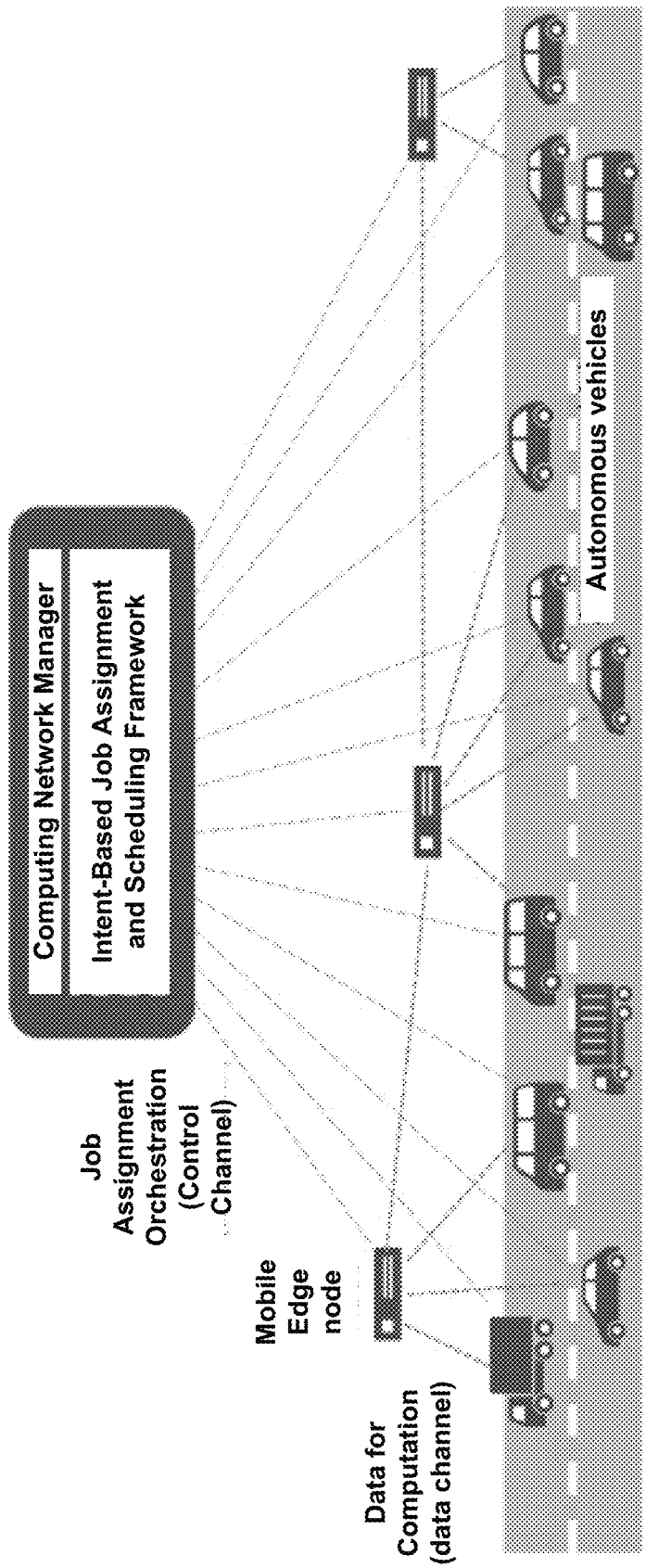
FIG. 10 is a schematic diagram showing an illustrative application in an autonomous vehicle system according to aspects of the present disclosure.

FIG. 10 is a schematic diagram showing an illustrative application in an autonomous vehicle system according to aspects of the present disclosure. When applied in an autonomous vehicle (self-driving car) system, there are a many dynamic computational needs arriving constantly, such as reading traffic signs, monitoring road conditions, computing route, and responding to sudden event.

As shown in FIG. 10, the system includes not only the individual vehicles (the client), but also a mobile edge computing infrastructure installed along the roadside, as well as a computing network manager that connects to all vehicles and the mobile edge computing nodes through wireless or wires connections. The computing network manager orchestrates the computation operation using the intent-based computing job assignment procedure proposed in this invention. The job requests and the control/orchestration decisions are transmitted through the control channels between the computing network manager and the individual client or edge node. There are also data channels between the client and the mobile edge node, and among the mobile edge nodes. These channels are used to send and receive the data for computation and the computation results.

During the autonomous driving operation, each vehicle has its on-board computer with sufficient computation power that can handle most of the computation needs, such as analyzing the other vehicles, pedestrians, road signs, lanes, etc. However, if there are special occasions, such as an exceptionally large crowd or an accident nearby involving an unusual situation, the on-board computer (client) might not be able to handle all the computation needs in time. In such a case, the computing network manager will then direct some computation needs, along with the data, to the mobile edge nodes on the road side. These mobile edge nodes have stronger computation power (e.g., faster processors, larger memory, and more storage), therefore these large scale computing requests can be processed in time. The computing network manager will also coordinate to send the computing results back to the correct client. Furthermore, the computing network manager will periodically train the management mode (e.g., the two neural networks proposed in this invention) based on the latest job request pattern and computation outcome for improving the job assignment decision.

Figure 11:
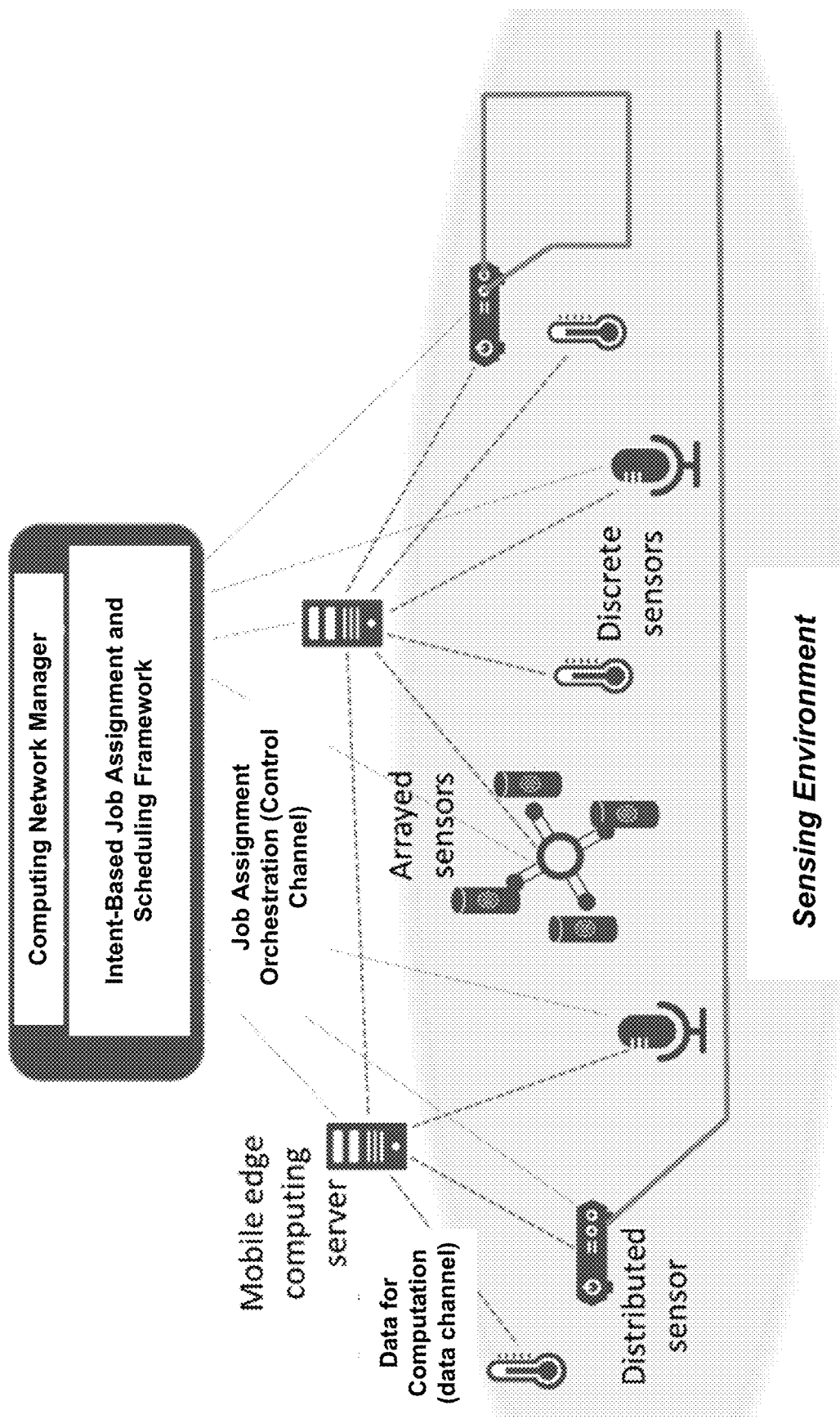
FIG. 11 is a schematic diagram showing an illustrative application in a sensor network according to aspects of the present disclosure.

FIG. 11 is a schematic diagram showing an illustrative application in a sensor network according to aspects of the present disclosure, where multiple sensors (such as distributed fiber optic sensors, accelerometers, geophones, thermometers, etc.) are connected in a network to monitor physical phenomena in a large area. This can also include other data from other input sources (such as video cameras and microphones) for data fusion and coordinated analysis. Some of these sensors include processors with certain computation power, which can analyze the data locally to extract environmental information. However, the processing power is often limited since it will add to the cost of the sensor hardware. Therefore, a computing network manager is set up and connected to all these sensors (clients) and those more powerful mobile edge computing servers.

During the sensing network operation, the computing network manager analyzes the individual computing requests that arrives dynamically, as well as the computing network status, and then uses the proposed intent-based computing job assignment procedure to decide where to perform each computing task (at the local sensors or at the servers), based on the client's request intent and the available resource.

Figure 12:
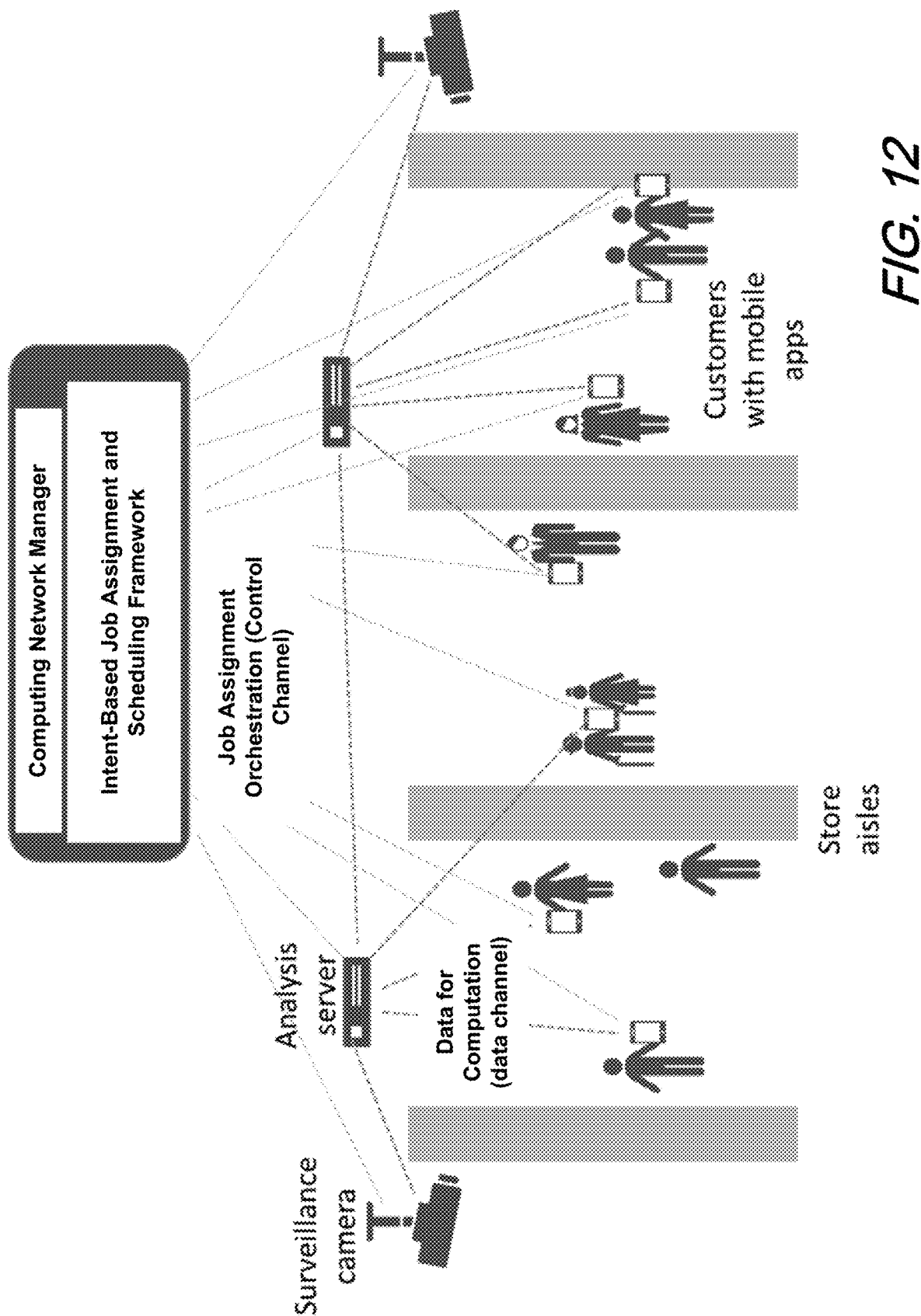
FIG. 12 is a schematic diagram showing an illustrative application in a smart retail application according to aspects of the present disclosure.

FIG. 12 is a schematic diagram showing an illustrative application in a smart retail application according to aspects of the present disclosure. As shown in FIG. 12, the system includes the mobile apps installed at each customer's device, the cameras installed at the store, the analysis servers, and the computing network manager that connects all of them through the Internet or the local network. The customer's mobile device can perform certain computing tasks to analyze the specific customer's intention or interest, but the computing power of each mobile device varies and is often limited. Some cameras may also have local processors to perform simple video analysis. To have an accurate analysis of the customer's intention and needs, long-term monitoring is needed, and a large amount of information collected from more locations is required. This needs to be done at the connected analysis server in the network. The computing network manager will assign the jobs based on the dynamically arriving requests using the proposed procedure, therefore the customers can be better served by delivering the right information and product recommendations to them in a short time.

There are many other use cases where our inventive intent-based computing job assignment procedure can be applied in real life situations.

As we have noted, our inventive procedure reconfigures intent-based computing job assignments when clients are mobile. For a given reconfiguration request, the procedure first determines the new set of optimal intent-based computing jobs assignments according to the client's current location. Then, the procedure verifies if the newly involved edge servers are overloaded or not. For those edge servers that are overloaded, the procedure appropriately selects a set of clients' services that are currently running on those edge servers and swaps them, such that enough computing resources are released to accommodate the reconfiguration request. Finally, affected clients' services that are swapped will go through the above reconfiguration steps to obtain a new set of intent-based computing job assignments. To summarize:

Our inventive procedure addresses the intent-based computing jobs assignment reconfiguration in the edge computing infrastructure when the clients are mobile. It minimizes the average response time for all the clients according to their current location. It minimizes the number of service interruptions during the reconfiguration process. It provides a guideline about how to reconfigure the client's intent-based computing job assignments, including what virtual topology to use and how to allocate the computing resource and bandwidth resource to efficiently accommodate the virtual topology. It provides a guideline for selecting and swapping out an appropriate set of requests from edge servers, to release the resource for accommodating the reconfiguration request. Advantageously, it performs the above while minimizing average response time and number of service interruptions.

Figure 13:
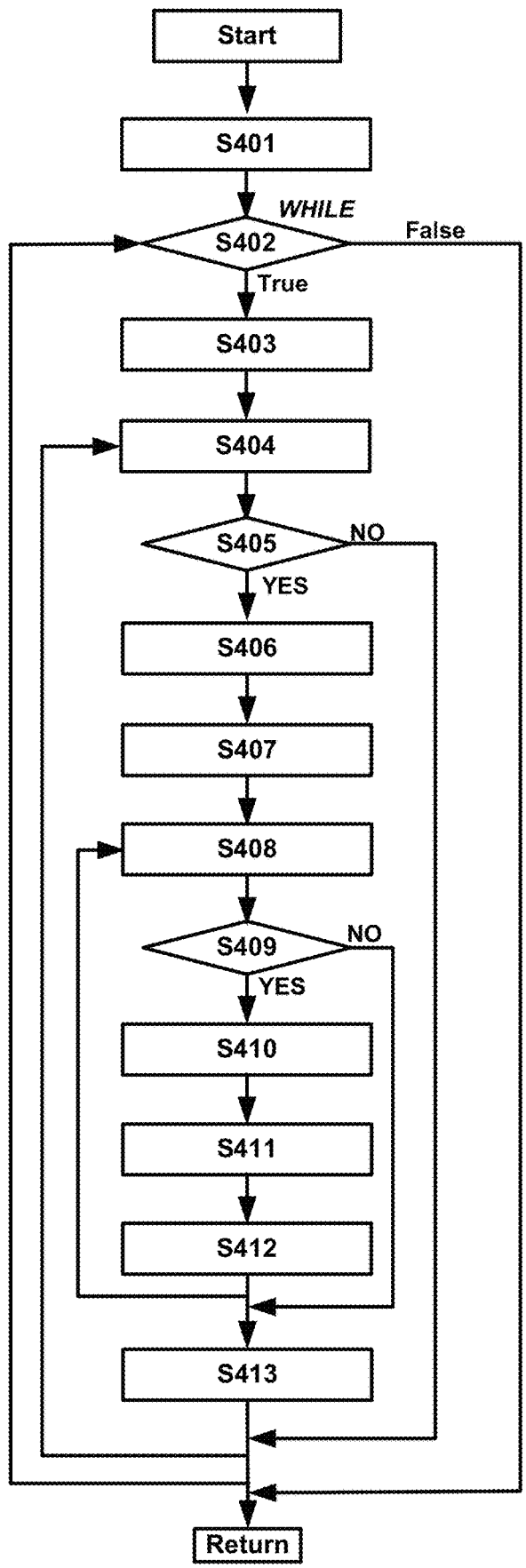
FIG. 13 is a schematic flow diagram showing an illustrative intent-based computing job assignment reconfiguration procedure according to aspects of the present disclosure.

FIG. 13 is a schematic flow diagram showing an illustrative intent-based computing job assignment reconfiguration procedure according to aspects of the present disclosure. Our inventive procedure includes a sub-procedure, which is a modified version of the previous sub-procedure described previously.

Our intent-based computing job assignment reconfiguration procedure is a follows.

Step 401: This step is the initialization step. For a given client's request that demands to be reconfigured, the procedure adds it to a list called to_process. This list stores all the requests that needs to be reconfigured, including the reconfiguration requests specified by the clients and the reconfiguration requests that are the result of the swap out operation in step 411.

Step 402: This step is the entering point of a while loop. It will check if all the requests in the list to_process have been processed or not. If the list is not empty, then the procedure applies step 403 to 413 to deal with the request in the list. If the list is empty, then it means there is no requests that need to be reconfigure, so the procedure returns.

Step 403: This step determines how to reconfigure the intent-based computing job requests in the list to_process. More specifically, the first request r in the list to_process is selected to be processed. Then, the procedure applies the modified version to determine the virtual topology and the mapping of the virtual topology, according to the client's current location.

Step 404: This step is the entering point of a for loop. For the given request r, a new virtual topology and the virtual topology mapping assignments can be determined after step 403. In the virtual topology assignment, there are a few edge servers that are assigned to support the computing demands of the virtual nodes in request r. The procedure will check each of these edge servers to see if it has enough computing resource to accommodate the demand from request r. The procedure will repeat step 405 to 413 for each of these newly involved edge servers s.

Step 405: This step will check if edge server s has reached its computing capacity if request r is reconfigured to be run on edge server s. If the computing capacity of edge server s will not be exceeded, then the procedure skips step 406 to step 413 and goes back to step 404 to check the next newly involved edge server. If the computing capacity of edge server s will be exceeded when accommodating request r, then the procedure will appropriately select a few current running services to swapped out (e.g., steps 406 to 413), so as to release sufficient computing resources to accommodate request r.

Step 406: This step is the preparation step for determining how to appropriately select running services to swap out on edge server s. It checks all the services (or requests) that are currently running on edge server s. It will sort all the requests according to the average communication hops, and save them in a list called sorted_requests. The intuition is that the request that has a large average communication hop may introduce a relatively long response time for the client. Hence, it is beneficial to reconfigure it, even before the client asks for reconfiguring, as efficiently reconfiguring it can reduce the average response time.

Step 407: This step is a preparation step for determine how many current running services needs to be swap out to save computing resources for accommodating request r. A variable called saved_computing will be created and initialized as 0. When enough computing resource is saved (e.g., saved_computing is greater than the computing demand from request r), the procedure can actually deploy request r to be run on edge server s (in Step 413).

Step 408: This step is the entering point of a for loop. It will check each of the current running services (or requests) on edge servers, which are already sorted (according to the average communication hops of the request) and saved in the list of sorted_requests, in order to find a set of appropriate services (or requests) to swap out for the purpose of releasing the computing resources to accommodate request r that is just reconfigured to be run on edge server s.

Step 409: This step checks if sufficient amount of computing resources has been saved using the requests that have been selected to swap out. If the amount of saved computing is less than the computing demand from request r, then the procedure will perform the actions in step 410, 411 and 412 and go back to step 408 to continue to find another current running service (or request) to swap out. If the amount of the saved computing is greater than or equal to the computing demand from request r, then the procedure can stop searching for more current running service (or request) to swap out and go directly to step 413 to deploy request r to be run on edge server s.

Step 410: This step swaps out the current running service (or request) c, and add it to the list of to_process. The reason that the procedure added c to to_process is to find a way to reconfigure request c after it is swapped out from edge server s.

Step 411: This step adds up the saved computing resource released by request c. After step Step 410 that swaps out request c from edge server s, the computing resources used by request c will be free up as saved computing resources to be used by the swap in request r.

Step 412: This step updates the utilization in edge server s. There are two operations to perform. First, the procedure removes request c from the serving list on edge server s, as c has been swapped out. Secondly, the procedure updates the computing resource utilization at edge server s to reflect the computing resources released by request c.

Step 413: This step performs the reconfiguration. It is run after the for loop from step 408 to 412. It will actually deploy request r to be run on edge server s, e.g., by adding request r to the serving list on edge server s. Then, the procedure allocates computing resources to meet the demanded computing requirements from request r, and updates the resource utilization status on edge server s.

Figure 14:
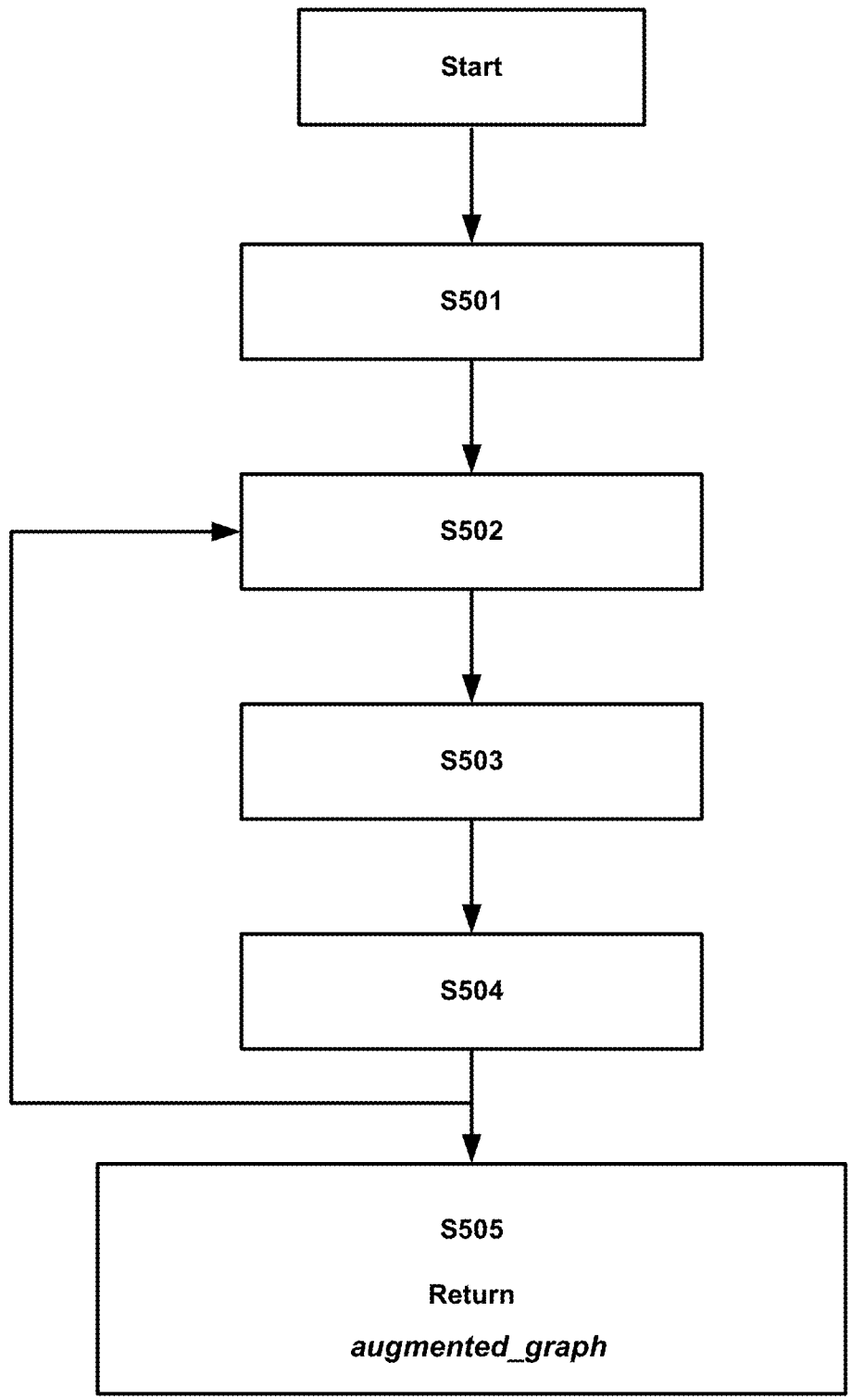
FIG. 14 is a schematic flow diagram showing an illustrative sub-procedure for creating an augmented graph in a modified intent-based computing job assignment procedure according to aspects of the present disclosure.

FIG. 14 is a schematic flow diagram showing an illustrative sub-procedure for creating an augmented graph in a modified intent-based computing job assignment procedure according to aspects of the present disclosure.

The modified intent-based computing jobs assignments procedure.

Compared to the prior work, the modified intent-based computing jobs assignments procedure has one distinguishing step in the sub-procedure of creating the augmented graph, which is in step 503. In the original procedure presented previously, step 203 establishes the augmented links from the given virtual node to all the physical nodes (or edge servers). Instead, step 503 in the modified intent-based computing jobs assignment procedure in this proposed invention works as follows.

Step 503: This step establishes augmented links from the given virtual node to the physical nodes (or edge servers) that are within N hops away from the ingress node of request r. As the client is mobile, the reconfiguration aims to re-allocate request r to be run at physical nodes (or edge servers) that are close to the client's current location, so that a fast response can be achieved. Hence, the procedure only considers the physical nodes (or edge servers) that are within N communication hops from the ingress point of request r as candidates. Here, N is a parameter that can be tuned by the edge computing carriers.

The proposed intent-based reconfiguration procedure can be used in a variety of applications in edge computing to efficiently accommodate the computing jobs when the clients are mobile. We will describe a few representative application use cases in the following parts.

First, the intent-based reconfiguration procedure can be used to support smart healthcare applications. In recent years, there are emerging mobile peripheral devices (such as iWatch, Fitbit, etc.) that are purposed to monitor the body health data (such as heartbeat, glucose level, etc.). The sensed body health data is collected by the peripheral devices, and then relayed to the smart phones that send the data to the servers in the edge cloud to be processed and analyzed. These servers may run machine learning algorithms to offer individual fitness plan or alert to the clients in real-time, thus achieving a smart healthcare.

In this scenario, the clients continuously upload the body health data to the edge servers in the edge computing for processing. In particular, the clients may carry their mobile peripheral devices (and their smart phones) and move around different locations, e.g., the clients are advised by their doctors to use their body sensing peripheral devices all the time, from home to work or grocery or gym. The client's body health data needs to be continuously processed in real-time during the monitor period. Intent-based reconfiguration is proposed to accommodate these requests when the clients are mobile.

Figure 15:
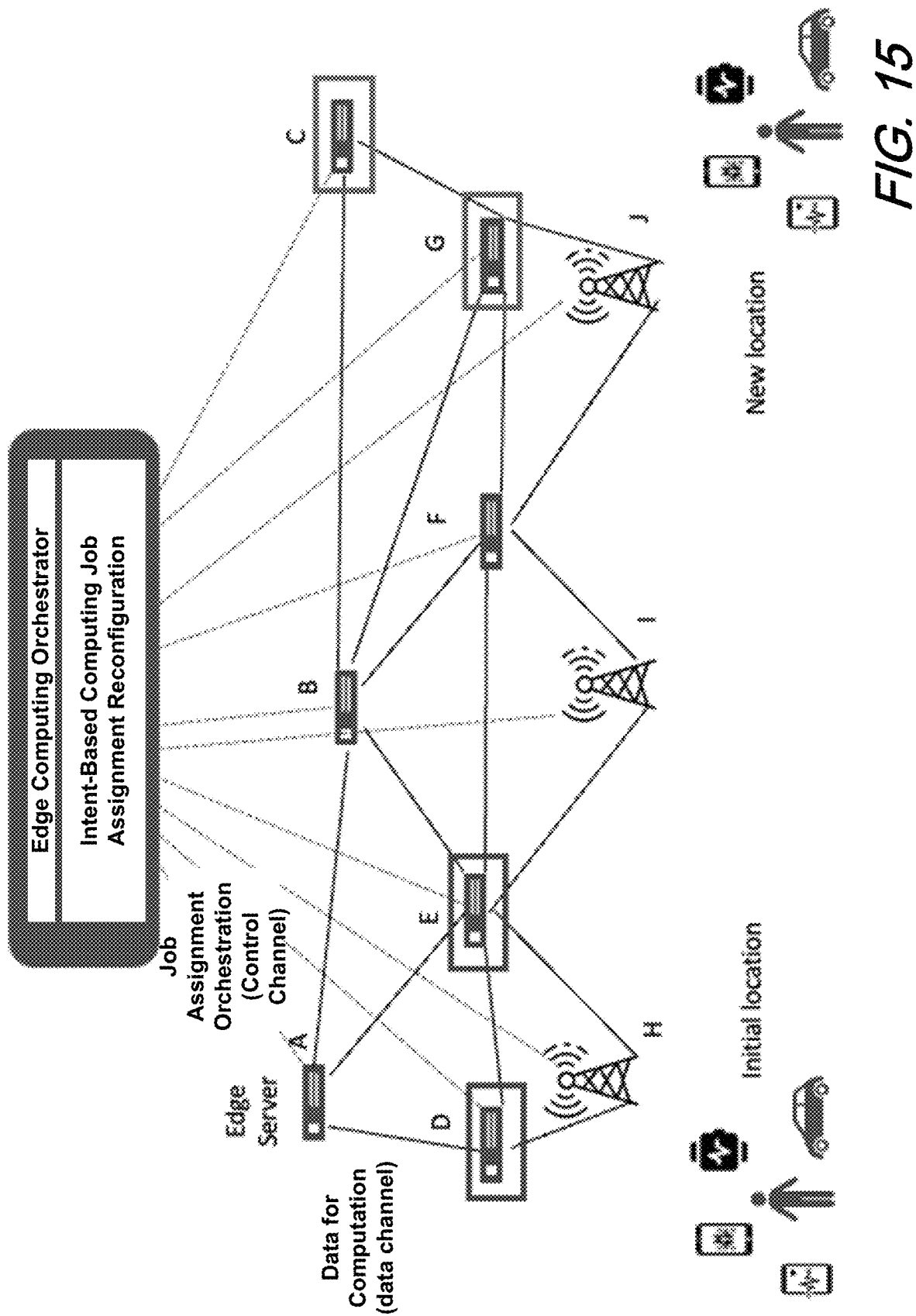
FIG. 15 is a schematic diagram showing an illustrative intent-based reconfiguration application use case according to aspects of the present disclosure.

FIG. 15 is a schematic diagram showing an illustrative intent-based reconfiguration application use case according to aspects of the present disclosure. As shown in the illustrative example in FIG. 15, a client sends their body health data to the edge computing for processing. Initially, the client is at the initial location (e.g., home), and thus the edge computing orchestrator provisions two edge servers that are near the client (e.g., edge server D and E) for the computing jobs with the intent of processing the client's body health data. After a certain amount of time, the client moves to a new location (e.g., their work place) that is far away from the initial location. If the client's body health data is still sent to the original two edge servers D and E, then there is a relatively long delay of the response due to the physical distance and the intermediate communication hops (e.g., J-F-E-D) between the two edge servers and the client's new location. For certain disease, such as heart attack, if there is a relatively long delay, then the alert that is supposed to be instantly sent to the client may be delayed, which could result in unpredictable risk or loss. Hence, we propose that the client's intent-based computing jobs should not be processed in a fixed location but should be appropriately reconfigured according to the mobility of the client. For example, when the client moves to the new location (as shown in FIG. 15), their intent-based computing jobs (with regarding to processing the body health data) can be reconfigured or re-allocated to edge servers G and C for processing, which are close to the client's new location, thus achieving a fast response. In addition to achieving a fast response, intent-based reconfiguration can also help reduce the network bandwidth consumption in the edge computing infrastructure.

As shown in FIG. 15, without intent-based reconfiguration, the body health data needs to travel a routing path of J-F-E-D and consume the network bandwidth along the way. As a comparison, with intent-based computing, the body health data only needs to consume the network bandwidth along the path of J-G-C. The reduced network bandwidth consumption can relieve the network pressure in the edge computing infrastructure, thus potentially increase the response time (e.g., because the network condition is better than those without intent-based reconfiguration). Intent-based reconfiguration can achieve the benefits of providing a fast response and a reduced network bandwidth consumption when the clients are mobile. As shown in FIG. 15, the proposed intent-based reconfiguration procedure can be run in the edge computing orchestrator to achieve the above-mentioned benefits.

Secondly, another application use case is in the field of smart transportation system, especially the application of route planning and traffic prediction. Given a pair of source and destination, the current GPS system provides a route planning service based on the real-time traffic and the predicted traffic. Both route planning and traffic prediction rely on a collective intelligence from satellites to all the vehicles on the roads, rather than a single vehicle running the application. In this application, the computing tasks of route planning and the traffic prediction are performed in the edge server and the cloud, through a distributed machine learning model called federated learning. The machine learning model is trained using the data that is captured by the vehicles on the road e.g., the number of vehicles around, and the vehicle's speed, etc.

For example, in FIG. 15, the smart vehicle at the initial location uploads the sensing data to the edge server at D and E so that the local machine learning model can be trained and updated, before the models are synchronized and aggregated to the global model in the cloud. When the smart vehicle moves to a new location as shown in FIG. 15, it is better to perform intent-based reconfiguration for the computing jobs to be performed at edge server C and G, so that a faster response can be achieved, and a reduced amount of network bandwidth is consumed.

Thirdly, another potential application use case of intent-based reconfiguration is in the field of mobile cybersecurity. Nowadays, as mobile devices, such as smart phones, are more ubiquitously involved in our lives (e.g., email, video streaming, online banking, etc.), there is an increasing concern about the security and privacy of mobile devices. On one hand, smart phones and apps are required to be designed and implemented in a secure way that the data is protected and the communication is secure. On the other hand, the smart phone has limited power, and limited computing and memory resources. Hence, there is a need for performing deep packet inspection and malicious detection using edge computing. The way it works is that the mobile device uploads the packet header information of the traffic in and out of the device to the edge server for such security purposed computing. Usually, deep packet inspection and malicious detection rely on machine learning models to achieve an accurate detection.

For example, in FIG. 15, the client at the initial location can upload the data to edge server D and E for security check. As we know, the client and their mobile devices are moving around. They could walk, run or take transportation to a different location that is far from the original assigned edge servers that perform the security check. In this case, intent-based reconfiguration plays an important role. It can accommodate the client's request in the edge server that is close to the client's current location, so that the security alert can be sent back in real-time. In addition, the cost to convey the packet header information from the phone to the edge server can be lowered after an appropriate reconfiguration is done.

At this point, while we have presented this disclosure using some specific examples, those skilled in the art will recognize that our teachings are not so limited. Accordingly, this disclosure should only be limited by the scope of the claims attached hereto.

The invention claimed is:

1. A computer implemented method for intent-based network computing job assignment, the method comprising:
   by the computer:
   for an intent-based computing job request r received to execute on a network, enumerate all possible candidate virtual nodes to be used for the intent-based job request r,
   for each enumerated candidate virtual node, construct an augmented graph, construct a Steiner tree that covers all virtual nodes in the augmented graph, map the virtual node to the Steiner tree, map a virtual link on the Steiner tree, based on a computing model included in the intent-based job request r, determine a bandwidth consumption for a corresponding virtual topology mapping,
   select a virtual topology and the corresponding virtual topology mapping that exhibits a minimum bandwidth consumption, and output an indication of the selected virtual topology and its mapping onto an infrastructure for subsequent deployment;
   wherein the augmented graph is constructed by:
   initializing an augmented graph having a topology of a physical infrastructure defining the network, and a set of stand-alone virtual nodes,
   for each stand-alone virtual node, establish an augmented link with each physical node, and set a weight of each augmented link to 0.

2. The method of claim 1 wherein the Steiner tree is a modified Steiner tree.

3. The method of claim 2 wherein the intent-based job request r, is reconfigured.

4. The method of claim 3 wherein the augmented graph is constructed by establishing an augmented link with physical nodes that are within N hops from an ingress access point to the network of the intent-based job request, r.

* * * * *